United States Patent
Mohan et al.

(10) Patent No.: US 8,917,731 B2
(45) Date of Patent: Dec. 23, 2014

(54) MULTI-PROTOCOL SUPPORT OVER ETHERNET PACKET-SWITCHED NETWORKS

(71) Applicant: Rockstar Consortium US LP, Plano, TX (US)

(72) Inventors: Dinesh Mohan, Kanata (CA); Florin Balus, Kanata (CA)

(73) Assignee: Rockstar Consortium US LP, Plano, TX (US)

( * ) Notice: Subject to any disclaimer, the term of this patent is extended or adjusted under 35 U.S.C. 154(b) by 0 days.

(21) Appl. No.: 13/933,330

(22) Filed: Jul. 2, 2013

(65) Prior Publication Data

US 2013/0287030 A1 Oct. 31, 2013

Related U.S. Application Data

(60) Continuation of application No. 13/110,380, filed on May 18, 2011, now Pat. No. 8,483,229, which is a division of application No. 12/278,294, filed as application No. PCT/US2007/062771 on Feb. 23, 2007, now Pat. No. 8,331,243.

(60) Provisional application No. 60/776,330, filed on Feb. 24, 2006.

(51) Int. Cl.
*H04L 12/28* (2006.01)
*H04L 12/46* (2006.01)
*H04L 12/723* (2013.01)
*H04L 12/721* (2013.01)

(52) U.S. Cl.
CPC .............. *H04L 45/68* (2013.01); *H04L 12/462* (2013.01); *H04L 12/4633* (2013.01); *H04L 12/465* (2013.01); *H04L 45/50* (2013.01)
USPC ........................................................ 370/395.5

(58) Field of Classification Search
None
See application file for complete search history.

(56) References Cited

U.S. PATENT DOCUMENTS

| | | | |
|---|---|---|---|
| 8,265,042 B1 * | 9/2012 | Nguyen et al. | 370/336 |
| 2004/0190548 A1 | 9/2004 | Harel et al. | |
| 2005/0099951 A1 | 5/2005 | Mohan et al. | |
| 2005/0141417 A1 | 6/2005 | Huang et al. | |
| 2005/0190757 A1 | 9/2005 | Sajassi | |
| 2006/0090008 A1 | 4/2006 | Guichard et al. | |
| 2006/0146832 A1 | 7/2006 | Rampal et al. | |
| 2007/0025241 A1 | 2/2007 | Nadeau et al. | |
| 2007/0030851 A1 | 2/2007 | Sinicrope et al. | |

(Continued)

OTHER PUBLICATIONS

Bryant et al., "Protocol Layer in PWE3", May 2002, Pseudo-Wire Edge-to-Edge(PWE3) Working Group Internet Draft, 33 pages.

*Primary Examiner* — Otis L Thompson, Jr.
(74) *Attorney, Agent, or Firm* — Schmeiser, Olsen & Watts LLP

(57) ABSTRACT

Described are methods and communications network for carrying pseudowires over packet-switched network. A communication network includes a packet-switched network (PSN), a first provider edge (PE) device in communication with a second PE device through the PSN, and a pseudowire (PW) established between the PE devices for emulating a service across the PSN. The PW has a Virtual Circuit Connection Verification (VCCV) control channel that carries an Ethernet Operations, Administration, and Maintenance (OAM) message. In some embodiments, various data plane encapsulation formats enable a PW to emulate an Ethernet or a non-Ethernet service over an Ethernet PSN. Each encapsulation format includes an Ethernet tunnel header and a PW header that encapsulates an Ethernet or non-Ethernet payload.

22 Claims, 16 Drawing Sheets

(56) References Cited

U.S. PATENT DOCUMENTS

| | | |
|---|---|---|
| 2007/0076719 A1 | 4/2007 | Allan et al. |
| 2007/0091804 A1 | 4/2007 | Pan et al. |
| 2007/0098006 A1 | 5/2007 | Parry et al. |
| 2007/0248085 A1 | 10/2007 | Volpano |
| 2007/0286090 A1 | 12/2007 | Rusmisel et al. |
| 2007/0286204 A1* | 12/2007 | Ould-Brahim ............. 370/395.5 |
| 2008/0056265 A1* | 3/2008 | Choi et al. .................... 370/392 |
| 2008/0212595 A1* | 9/2008 | Figueira et al. ............... 370/401 |
| 2008/0285466 A1* | 11/2008 | Salam et al. ................ 370/241.1 |
| 2009/0185573 A1* | 7/2009 | Guichard et al. ............. 370/401 |
| 2011/0292948 A1* | 12/2011 | Delregno ..................... 370/401 |

* cited by examiner

MULTI-PROTOCOL SUPPORT OVER ETHERNET PACKET-SWITCHED NETWORKS

RELATED APPLICATIONS

This utility application is a continuation patent application of U.S. patent application Ser. No. 13/110,380, filed on May 18, 2011, which in turn is a divisional patent application of U.S. patent application Ser. No. 12/278,294, filed on Aug. 5, 2008, which is a U.S. national stage entry of PCT application no. PCT/US2007/062771, filed Feb. 23, 2007, which claims the benefit of U.S. Provisional Patent Application No. 60/776,330, filed on Feb. 24, 2006, the entirety of which applications are incorporated by reference herein.

FIELD OF THE INVENTION

The invention relates generally to communications networks. More particularly, the invention relates to multi-protocol support over Ethernet packet-switched networks.

BACKGROUND

Transport networks are typically required to support transmission of different protocols across them. Multi-protocol support is therefore required across Ethernet packet-switched networks. Pseudowire (PW) is one such industry-accepted mechanism for transferring information across a packet-switched network (PSN). Often identified with the protocol for forwarding packets, examples of PSNs include, but are not limited to, Internet Protocol (IP), Layer-Two Tunneling protocol (L2TP), Ethernet, and MPLS (Multi-Protocol Label Switching) networks. In general, a PW emulates the attributes of a native service supported across the PSN. In effect, a PW decouples the native service, i.e., the protocols and applications, from the underlying facilities that carry the service. The types of emulated services that may be carried by a PW include, but are not limited to, Asynchronous Transfer Mode (ATM), Frame Relay (FR), Point-to-Point Protocol (PPP), High Level Data Link Control (HDLC), Synchronous Optical Network (SONET), Synchronous Digital Hierarchy (SDH), X. 25, TDM (Time Division Multiplexing), DSL (Digital Subscriber Line), and Ethernet.

FIG. 1 shows a prior art implementation of a communications network 10 in which a PW 12 is established between an ingress provider edge (PE) 14 and an egress provider edge (PE) 16. The PW 12 emulates a native service (e.g., ATM, Ethernet, Frame Relay, T1/T3, etc.) across a PSN 18. Each PE 14, 16 is in communication with at least one customer edge (CE) device 20 (each of which are part of a customer network). Each CE 20 communicates with a PE 14, 16 through an attachment circuit (AC), which is, generally, a physical or logical circuit configured for the particular technology of the native service.

Industry has devised various mechanisms for establishing PWs to carry different native services over MPLS and IP networks. Such mechanisms typically involve "normalizing" payload of the native service for transmission through the PW over the PSN. One technique for normalizing payload is an MPLS encapsulation, referred to as Martini-encapsulation, which uses a control word to distinguish PW payload from standard IP payload. In general, a control word is an optional header used in some encapsulations to carry per-packet information. Bryant, S. et al, in "PWE3 Control Word for use over an MPLS PSN", October 2005, describes the use of control words in MPLS PSNs for such purpose. Such encapsulation entails the use of a label (referred to as a Virtual Circuit (VC) label or as PW label) for providing a demultiplexer for the PW through the PSN tunnel, e.g., a Label-Switched Path (LSP).

In addition to MPLS and IP PSNs, Ethernet is fast emerging as a viable PSN technology and becoming more widely used, particularly in metro-area networks. Besides being able to offer Ethernet connectivity services, e.g., E-Line, E-LAN, and E-Tree, multi-protocol transport is also a requirement across Ethernet PSNs. Even with the IP and MPLS PSNs, service providers have a limited number of mechanisms to choose from by which they can perform fault detection and diagnostics in order to verify the connectivity of their multi-protocol transport services via PWs. Current mechanisms, such as ICMP (Internet Control Message Protocol) ping, BFD (Bidirectional Forwarding Detection), and MPLS ping, provide only limited OAM (Operations, Administration, & Maintenance) functionality. Moreover, such mechanisms are unduly complicated and have limited application in certain network environments. For instance, current mechanisms do not support verifying the end-to-end connectivity of multi-segment PWs. Thus, there is a need for improving current fault detection and diagnostics mechanisms for single segment and multi-segment PWs including their use in Ethernet PSNs.

SUMMARY

In one aspect, the invention features a communications network comprising an Ethernet packet-switched network (PSN), a first provider edge (PE) device in communication with a second PE device through the Ethernet PSN, and a pseudowire (PW) established between the PE devices for emulating a service across the Ethernet PSN. Each packet of the service has a frame format with an Ethernet tunnel header and a PW header that encapsulates a payload.

In another aspect, the invention features a method of emulating a non-Ethernet service across an Ethernet packet-switched network (PSN). The method comprises establishing a pseudowire (PW) between a first provider edge (PE) device and a second PE device on the Ethernet PSN, receiving packets of the service at the first PE device for forwarding to the second PE device through the Ethernet PSN over the PW, and encapsulating a payload of each packet of the service in a PW header and in an Ethernet tunnel header.

In still another aspect, the invention features a communications network comprising a packet-switched network (PSN), a first provider edge (PE) device in communication with a second PE device through the PSN, and a pseudowire (PW) established between the PE devices for emulating a service across the PSN. The PW has a Virtual Circuit Connection Verification (VCCV) control channel that carries an Ethernet Operations, Administration, and Management (OAM) message.

In another embodiment, the communications network includes an Ethernet packet-switched network (PSN), a first provider edge (PE) device in communication with a second PE device through the Ethernet PSN; and a pseudowire (PW) established between the PE devices for emulating a service across the Ethernet PSN. The PW has a control channel that carries an Ethernet Operations, Administration, and Management (OAM) message.

In still another aspect, the invention features a method of verifying connectivity of a pseudowire (PW) through a packet-switched network (PSN). The method comprises establishing a pseudowire through the PSN between a first provider edge (PE) device and a second PE device, providing a Virtual Circuit Connection Verification (VCCV) control channel in the PW, and carrying an Ethernet Operations, Administration, and Management (OAM) message in the VCCV control channel.

BRIEF DESCRIPTION OF THE DRAWINGS

The above and further advantages of this invention may be better understood by referring to the following description in conjunction with the accompanying drawings, in which like numerals indicate like structural elements and features in various figures. The drawings are not necessarily to scale, emphasis instead being placed upon illustrating the principles of the invention.

DETAILED DESCRIPTION

In brief overview, communications networks embodying the invention can forward non-Ethernet payloads associated with non-Ethernet native services through pseudowires (PWs) over Ethernet packet-switched networks (PSNs), e.g., Provider Backbone Transport (PBT) and Provider Backbone Bridge (PBB) networks. Any one of various data-plane encapsulation formats, described herein, can be used to encapsulate the non-Ethernet payloads for forwarding over an Ethernet PSN. Each encapsulation format includes an Ethernet tunnel header and a PW header that encapsulates a PW protocol data unit (PDUs). In general, a PW PDU contains all of the data and control information needed to emulate the particular non-Ethernet service.

Other embodiments of communications networks use a Virtual Circuit Connection Verification (VCCV) control channel in a PW to send Ethernet OAM (Operations, Administration, & Maintenance) messages over through PSNs (which may be an Ethernet PSN or otherwise). In general, VCCV supports connection verification messages for PWs over PSNs Adaptations to VCCV, in accordance with the invention, introduce Ethernet OAM as a viable option for performing operations and maintenance functions.

Figure 1:
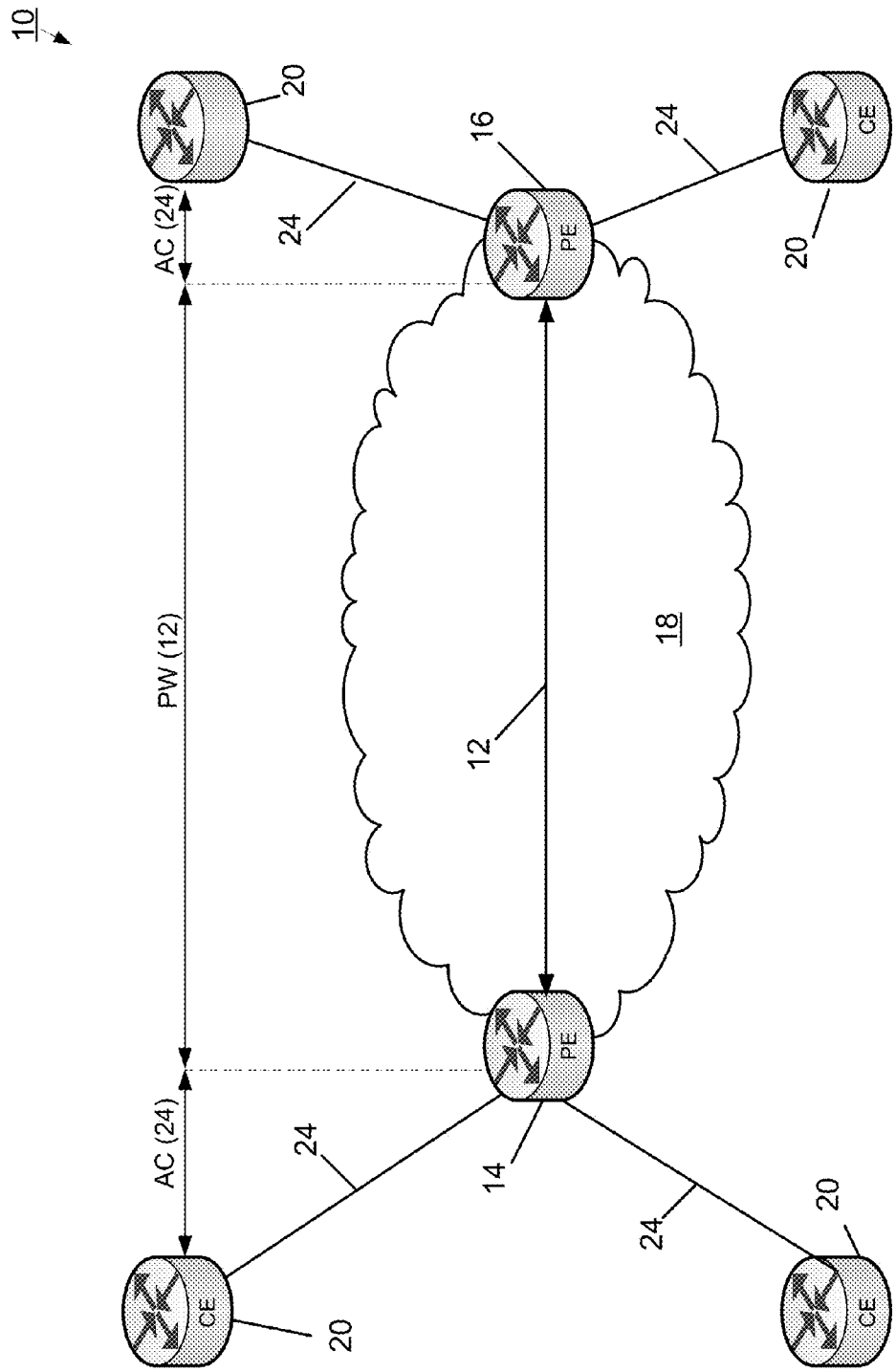
FIG. 1 is a diagrammatic representation of a prior art implementation of a communications network in which a pseudowire (PW) is established between an ingress provider edge device and an egress provider edge device across a packet-switched network.
Figure 2:
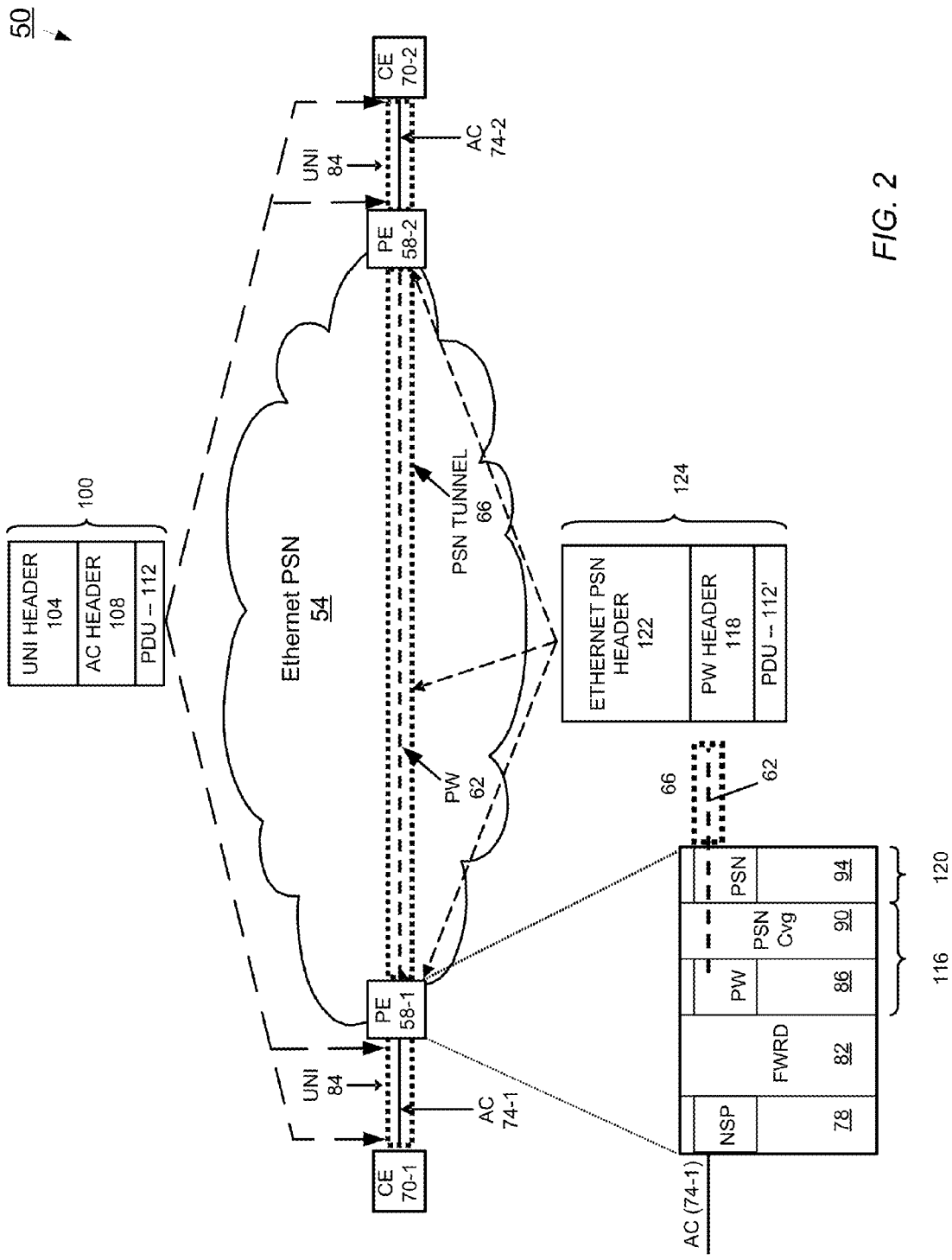
FIG. 2 is a diagrammatic representation of an embodiment of a communications network embodying the invention, including a PW traversing an Ethernet PSN.

FIG. 2 shows an embodiment of a communications network 50 embodying the principles of the invention. The network 50 includes an Ethernet packet switched network (PSN) 54. The PSN 54 corresponds to a separate network domain managed by a service provider. The PSN 54 includes first and second provider edge (PE) devices 58-1, PE 58-2 (generally PE 58). In general, a PE device is a network element or device that provides a PW to a customer edge (CE) device. For purposes of describing the invention, the PE device 58-1 is referred to as ingress PE 58-1, and the PE device 58-2 as egress PE 58-2. Not shown are the various intermediate devices (or nodes) between the PEs 58.

In one embodiment, the Ethernet PSN 54 is configured as a Provider Backbone Bridge (PBB) network, also known as IEEE 802.1ah and MAC-in-MAC (MiM). The IEEE 802.1ah draft standard defines a service provider MAC header that encapsulates a customer MAC frame. The service provider MAC header includes B-MAC SA and B-MAC DA fields to indicate the source address and destination address, respectively, of the backbone (i.e., PSN 54). Also defined are a backbone VLAN ID (B-VID) and a Service Instance ID (I-SID).

In a PBB network, devices (or nodes) can make forwarding decisions based on the values in the B-MAC and B-VID fields. Accordingly, PBB provides Ethernet tunneling based on: 1) the B-MAC SA/DA pair; and 2) the B-VID. The I-SID field can serve to provide a service delimiter—the size of the field, 24-bits, can theoretically support as many as 16 million service instances—thus, overcoming the scalability limitation of 4094 provider VLANs of IEEE 802.1 ad (Q-in-Q).

By isolating the service provider MAC header from the customer MAC header, PBBs separate the communications network 50 into customer domains and service provider domains. Within the service provider domain (i.e., PSN 54), the nodes forward packets based on the service provider MAC header—the customer MAC header is not visible except at the edge of the service provider domain.

In other embodiments, the Ethernet PSN 54 is configured to support Provider Backbone Transport (PBT) technology. In brief overview, PBT provides the Ethernet PSN 54 with connection-oriented forwarding behavior. Through PBT, service providers are able to establish point-to-point Ethernet tunnels and specify paths that service traffic will take through their Ethernet networks. More specifically, PBT allocates a range of VLAN IDs (VIDs) to identify specific paths through the PSN 54 to a given destination MAC address. PBT requires the combination of VID and the MAC DA address (total 60 bits) to be globally unique, but individually VID or MAC do not have to be globally unique for PBT trunks. Because the combination of the MAC DA and the VID uniquely identifies each path, VIDs within the reserved range can be reused to identify paths between different pairs of PEs.

Referring back to FIG. 2, the ingress PE 58-1 is in communication with the egress PE 58-2 over a PW 62, which the PEs 58 establish in accordance with a control protocol, such as the protocol described in Martini, L. et al, "Pseudowire Setup and Maintenance using the Label Distribution Protocol (LDP)", RFC 4447, April 2006. As described herein, the PW 62 carries non-Ethernet payloads over the Ethernet PSN 54. The PW 62 can also carry Ethernet payload over the Ethernet PSN 54. This enables service providers to offer "emulated" services, e.g., ATM, Frame Relay, T1 leased lines, over established Ethernet networks. The PW 62 traverses the Ethernet PSN 54 through an Ethernet PSN tunnel 66. The PEs 58 may be IEEE 802.1ah (PBB) enabled and/or PBT enabled. Depending on their configuration and the type of Ethernet network, the PEs 58 can employ one of a plurality of different encapsulation formats to encapsulate non-Ethernet payload within the PW 62, as described in more detail below.

The PE 58-1 is in communication with a customer edge (CE) device 70-1 by way of an attachment circuit (AC) 74-1; PE 58-2 is in communication with CE 70-2 by way of AC 74-2. In general, the CE 70 is a device at which a network service originates or terminates (or both). The CEs 70 operate unaware that the PSN 54 is employing the PW 62 to provide an emulated service instead of a native service.

Each AC 74 is a physical or virtual circuit connecting the CE 70 to a respective PE 58. Example embodiments of ACs 74 include, but are not limited to, a Frame Relay DLCI (data link connection identifier), an ATM VPI/VCI (Virtual Path Identifier/Virtual Channel Identifier), an Ethernet port, a VLAN (Virtual LAN), an HDLC (High-Level Data Link Control) link, a PPP (Point-to-Point protocol) connection on a physical interface, a PPP session from an L2TP (Layer 2 Tunneling Protocol) tunnel, and an MPLS LSP (Label Switched Path). If both physical and virtual ACs are of the same technology (e.g., both ATM, both Ethernet, both Frame Relay) the PW is said to provide "homogeneous transport," otherwise the PW is said to provide "heterogeneous transport". Each AC 74 is part of a user-to-network interface (UNI) 84 between the PE 58 and CE 70.

For supporting pseudowires, the PE 58-1 (as a representative example of PEs in general) includes a plurality of subsystems: a Native Service Processing (NSP) subsystem 78, a forwarder (FWRD) 82, a PW processor (including a PW demultiplexer) 86, an optional PSN convergence subsystem 90, and a PSN processing subsystem 94. These subsystems correspond to various layers of a logical-protocol layering model described in Bryant, S. et al, "Pseudo Wire Emulation Edge-to-Edge (PWE3) Architecture)", RFC 3985, March 2005, the entirety of which is incorporated by reference herein.

In brief overview, the NSP 78 processes data received by the PE 58-1 from the CE 70-1 before presenting the data to the PW 62 for transmission across the PSN 54. In addition, the NSP 78 processes data received by the PE 58-1 from the PW 62 before the data are output on the AC 74-1. The forwarder 82 selects the PW 62 that is to be used to transmit a payload received on the AC 74-1 from the CE 70-1.

The PW processor 86, in conjunction with the PSN convergence subsystem 90, encapsulates the native service payload (as a PW PDU 112) within a PW header 116. The PW demultiplexer (here embodied within the PW processor 86) provides the capability to deliver multiple PWs over a single PSN tunnel. The PSN convergence subsystem 90 provides an interface to the PW, enabling the PW to be independent of the particular type of PSN. PSN convergence is optional in that its functionality is not needed if the PSN already satisfies the requirements of the service. The PSN subsystem 94 identifies the particular PSN tunnel 66 for the PW and encapsulates the PW header 118 and PW PDU 112 in a Ethernet PSN header 122.

During operation, the CE 70-1 sends a packet 100 over the AC 74-1 to the ingress PE 58-1. The packet 100 includes a UNI header 104, an AC header, and a layer 2 PDU 112. The ingress PE 58-1 receives the packet 100. The NSP/Forwarder 78/82 of the PE 58-1 passes a frame with the PDU 112 to the PW processor 86. From the frame, the PW processor 86 removes any preamble and may remove the FCS (Frame Check Sequence). Then, the PW processor 86/PSN convergence 90 prepends (116) an appropriate PW header 118 to the PW PDU 112'. (The PW PDU 112' corresponds to a slightly modified version of the PDU 112 received from the CE 70-1.) The PSN subsystem 94 then prepends (120) the appropriate tunnel encapsulation (i.e., Ethernet PSN header 122) to the PW header 118 and PW PDU 112'. The PE 58-1 transmits the resulting packet 124 over the PW 62 through the PSN tunnel 66.

When the packet 124 arrives at the egress PE 58-2, the PSN subsystem 94 and PW processing subsystem 86 remove, respectively, the Ethernet tunnel header 122 and PW header 118. If the PW header 118 includes a control word, the PW processing subsystem 86 processes and removes it. The resulting frame (with the PDU 112) then passes to the Forwarder/NSP 82, 78, which regenerates, if necessary, the FCS. The UNI 84-2 encapsulates the PDU 112 with an AC header 108 and a UNI header 104 before transmitting the resulting packet 100 to the CE device 70-2 by way of the AC 74-1.

Figure 3:
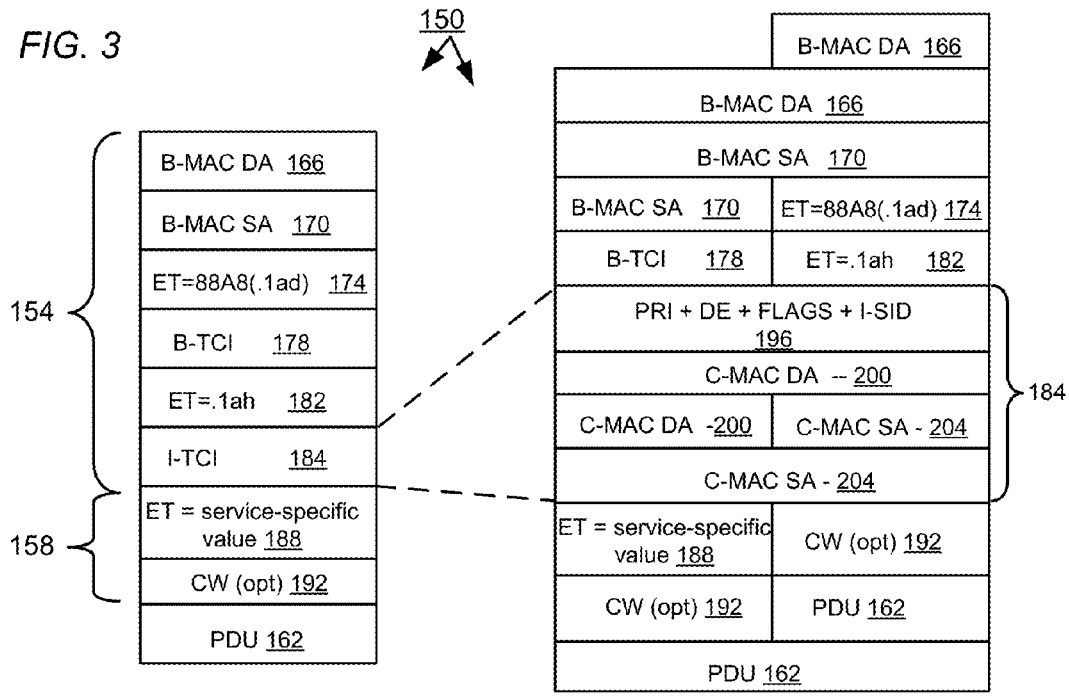
FIG. 3 is a diagram of an embodiment of an encapsulation format used to encapsulate service payload in a packet for forwarding over the PW through the Ethernet PSN, as described in FIG. 2.

FIG. 3 shows an embodiment of a data-plane encapsulation format 150 for a packet carried by a PW over an Ethernet PSN. The right-hand side of FIG. 3 shows a byte-alignment version of the format 150. In this embodiment, the PEs 58 are configured to support PWs over PBB and PBT technologies. The format 150 includes a PSN tunnel header 154, a PW header 158, and a PW PDU 162. The PW PDU 162 can be used to hold the payload of any type of native service (e.g., ATM, Ethernet, Frame Relay, T1/T3, etc.).

The PSN tunnel header 154 includes a B-MAC DA field 166, a B-MAC SA field 170, a first Ethertype (ET) field 174 (here, set equal to 88A8 or 802.1ad), a B-TCI (Tag Control Information) field 178, a second ET field 182 (here, signifying the 802.1ah—or PBB—Ethertype), and a I-TCI field 184.

As seen on the right-hand side of FIG. 3, the I-TCI field 184 includes an I-SID field 196, a customer MAC destination address (C-MAC DA) 200, and a customer MAC source address (C-MAC SA) 204.

The PW header 158 includes an ET field 188 (here, set to a service-specific value) and an optional control word 192. The particular service-specific value placed in the ET field 188 identifies the type of service associated with the payload. There is a different value for each type of non-Ethernet service; i.e., a first unique value indicates that the PDU 162 includes ATM payload, a second unique value indicates a Frame Relay payload, a third unique value indicates T1 payload, and so forth. In addition, the Ethertype is different from 8847 (i.e., Martini). Accordingly, this encapsulation format 150 forgoes specifying a VC label and is able to avoid MPLS entirely within the PBB/PBT network 54. The PDU (payload) 162 is Martini-encapsulated.

Figure 4:
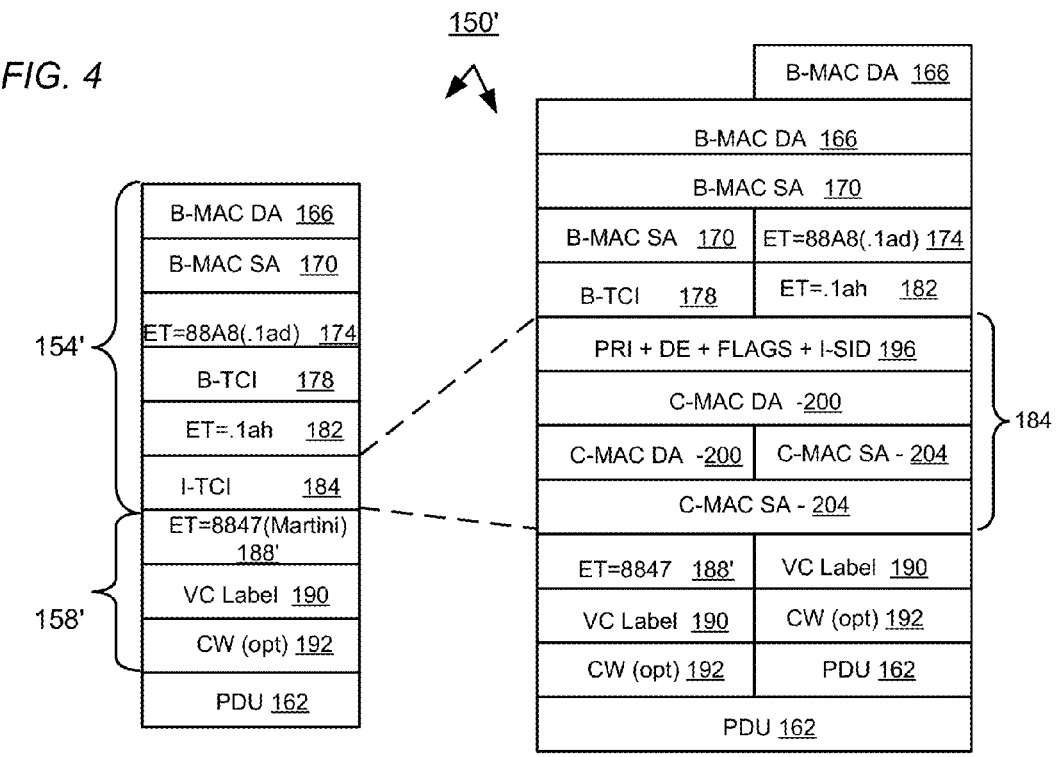
FIG. 4 is a diagram of a second embodiment of an encapsulation format used to encapsulate service payload in a packet for forwarding over the PW over the PW through the Ethernet PSN, as described in FIG. 2.

FIG. 4 shows another embodiment of a data-plane encapsulation format 150' for a packet carried by a PW over an Ethernet PSN (i.e., PBB/PBT), the right-hand side again showing a byte-alignment version of the format 150'. The format 150' includes a PSN tunnel header 154', a PW header 158', and a PDU 162. As previously described in connection with the encapsulation format 150, the PDU 162 can be associated with any type of native service. In addition, the fields of the PSN tunnel header 154' are the same as those for the previously described PSN tunnel header 154 of the data-plane encapsulation format 150.

The PW header 158' includes an ET field 188' (here, set to 8847), a VC label 190, and an optional control word 192. Here, the 8847 value in the ET field 188' signifies Martini encapsulation. In this embodiment, the PBB/PBT network manages the VC label 190 differently from the I-SID 196. The PDU (payload) 162 is Martini-encapsulated.

The encapsulation formats 150, 150' are compatible with an Ethernet 802.1ah network. An advantage in using such encapsulation formats 150, 150' is that devices in the Ethernet network can manage MiM and multi-protocol non-Ethernet traffic uniformly. Devices on such an Ethernet network can distinguish between MiM traffic and PW-over-PBB or PW-over-PBT traffic based on the EtherType following the I-TCI field in the packet. If the EtherType (ET) is equal either to a service-specific value or to 8847, the devices in the Ethernet network can ignore the data in the C-MAC DA and C-MAC SA fields of the I-TCI field. Otherwise, the devices use the data in the C-MAC DA and C-MAC SA fields for forwarding decisions.

Figure 5:
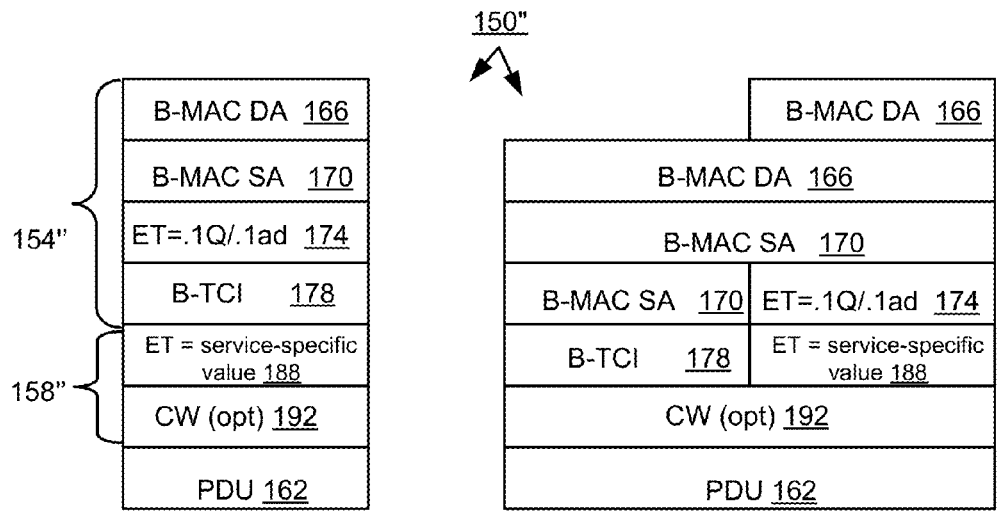
FIG. 5 is a diagram of a third embodiment of an encapsulation format used to encapsulate service payload in a packet for forwarding over the PW through the Ethernet PSN, as described in FIG. 2.

FIG. 5 shows another embodiment of a data-plane encapsulation format 150" for a packet carried by a PW over a PBT network (i.e., without PBB capability), with the right-hand side showing a byte-alignment version. The format 150" includes a PBT trunk header 154", a PW header 158", and a PDU 162. As described in connection with the previous encapsulation formats, the PDU 162 can be associated with any type of native service.

The PBT tunnel header 154" includes a B-MAC DA field 166, a B-MAC SA field 170, an Ethertype (ET) field 174 (here, set equal to either 802.1Q or to 802.1ad), and a B-TCI. Because this embodiment does not involve PBB, the PBT trunk header 154" lacks an 802.1ah Ethertype field and an I-TCI field (which are present with the previously described formats 150, 150').

The PW header 158" includes an ET field 188 (here, set to a service-specific value) and an optional control word 192. As described in connection with the first-described encapsulation format 150, the particular service-specific value placed in the ET field 188 identifies the type of service associated with the payload, and is a different value from 8847 (Martini). This encapsulation format 150" forgoes specifying a VC label and is able to avoid MPLS entirely within the PBT network. The PDU (payload) 162, which can be associated with any type of native service, is normalized through Martini-encapsulation. PBT networks employing this embodiment of encapsulation format are unable to multiplex service instances on the PBT trunk (i.e., the PSN tunnel); accordingly, a PBT connection is dedicated to each service instance.

Figure 6:
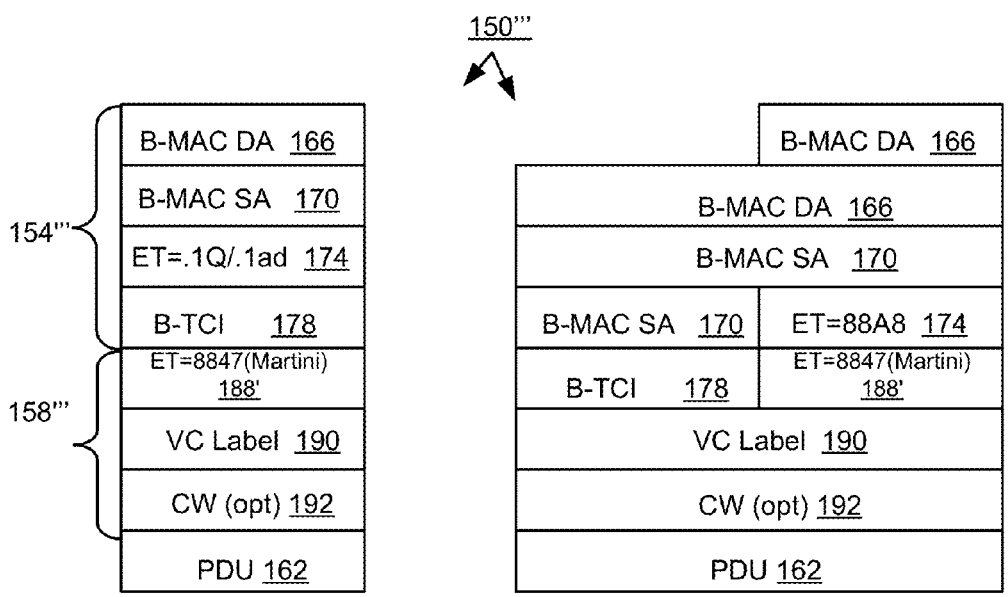
FIG. 6 is a diagram of a fourth embodiment of an encapsulation format used to encapsulate service payload in a packet for forwarding over the PW through the Ethernet PSN, as described in FIG. 2.

FIG. 6 shows another embodiment of a data-plane encapsulation format 150'" for a packet carried by a PW over a PBT network (without PBB capability), with the right-hand side showing a byte-alignment version. The encapsulation format 150'" includes a PBT trunk header 154'", a PW header 158'", and a PDU 162. As described in connection with the previous encapsulation formats, the PDU 162 can be associated with any type of native service.

The PBT tunnel header 154'" includes a B-MAC DA field 166, a B-MAC SA field 170, an Ethertype (ET) field 174 (here, set equal to either 802.1Q or to 802.1ad), and a B-TCI field 178. Like the encapsulation format 150", the PBT trunk header 154'" lacks an 802.1ah Ethertype field and an I-TCI field.

The PW header 158'" includes an ET field 188' (here, set to 8847), a VC label 190, and an optional control word 192. Here, the 8847 value in the ET field 188' again signifies Martini encapsulation. The PBT network manages the VC label 190 (differently from management of an I-SID). The PDU (payload) 162 is normalized by Martini-encapsulation. PBT networks employing this embodiment of encapsulation format are capable of multiplexing different service instances (of the same service type) on the PBT trunk.

An aspect of the encapsulation formats 150" and 150'" is that the deployment of PWs thus encapsulated is not dependent on the 802.1ah draft standard. In addition, such encapsulation formats have less overhead because they do not include or require customer (C-)MAC destination and source addresses.

Figure 7:
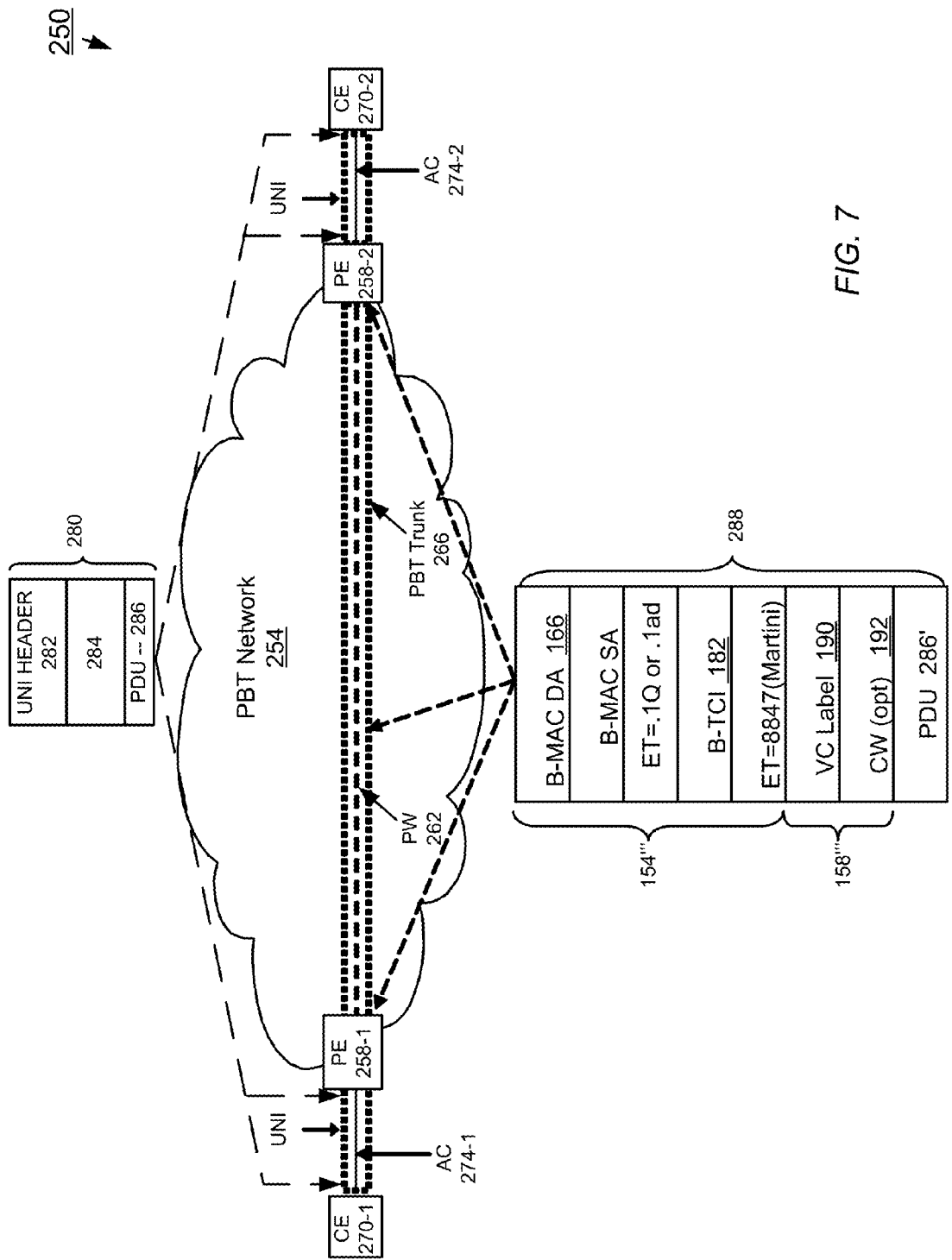
FIG. 7 is a diagram of a PW traversing an Ethernet packet-switched network in accordance with one embodiment of the invention.

FIG. 7 illustrates an exemplary embodiment of a communications network 250 in which non-Ethernet service frames are forwarded through a single-segment PW—encapsulated using the encapsulation format 150'"—over a PBT network. Use of the encapsulation format 150'" is illustrative; any of the above-described encapsulation formats can be used to encapsulate the PW over the PBT network.

The communications network 250 includes similar network elements to those of the network embodiment described in connection with FIG. 2. More specifically, the network 250 includes a PBT network 254 (i.e., an Ethernet network), an ingress PE 258-1 in communication with a CE 270-1 over an AC 274-1, an egress PE 258-2 in communication with a CE 270-2 over an AC 274-2. The ingress PE 258-1 is in communication with the egress PE 258-2 over a PW 262, which traverses the PBT network 254 through a PBT trunk 266.

The CE 270-1 sends a non-Ethernet service frame (or packet) 280 over the AC 274-1 to the ingress PE 258-1. The frame 280 includes a UNI header 282, an AC header 284, and a PDU 286. The ingress PE 258-1 receives the frame 280, removes the header information leaving the PDU 286, and prepends a PW header 158'" and a PBT trunk header 154'" to produce the frame 288. The PE 258-1 transmits the resulting frame 288 over the PW 262 through the PBT trunk 266. Devices in the PBT network 254 make forwarding decisions for the frame 288 based on the values in the B-MAC DA field and the B-TCI fields.

At the destination end of the PW 262, the egress PE 258-2 removes the PBT trunk header 154'" and PW header 158'", determines the particular flow to which the frame 288 belongs based on the value of the VC label 190, processes and removes any control word 192 in the PW header 158'''. The PE 258-2 encapsulates the PDU 286 with an AC header 280 and a UNI header 282 before transmitting the frame 280 to the CE device 270-2 by way of the AC 274-2.

Figure 8:
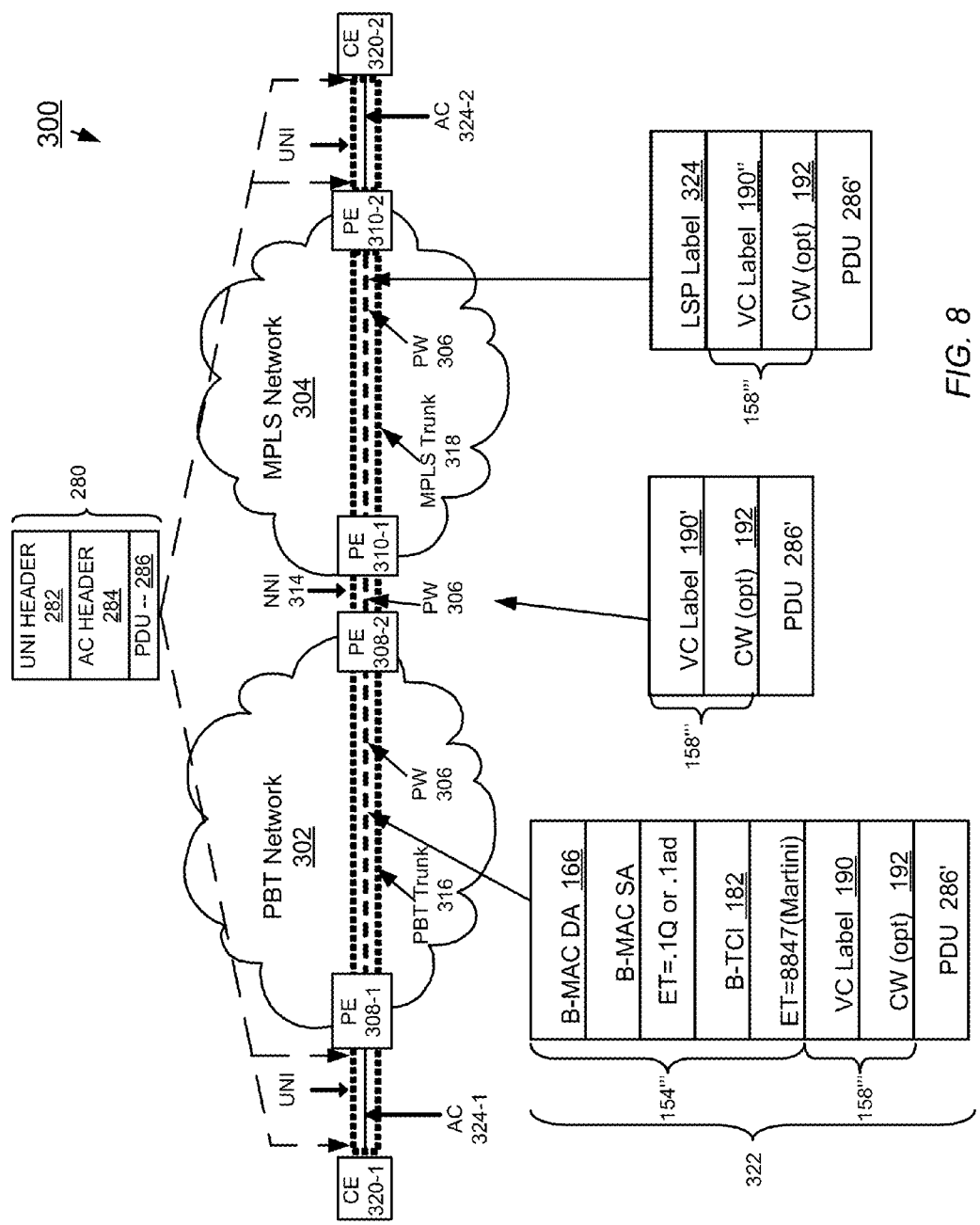
FIG. 8 is a diagram of an embodiment of a PW traversing an Ethernet network and an MPLS network in accordance with the invention. I try to include this information in the spec, and be minimalist with text in the figures (for Foreign Filing sake).

FIG. 8 illustrates an exemplary embodiment of a communications network 300 in which non-Ethernet service frames are forwarded through a multi-segment PW 306 that spans a PBT network 302 and an MPLS network 304. Within the PBT network 302, the frames are encapsulated using the encapsulation format 150''', which is merely illustrative; any of the other above-described encapsulation formats 150, 150', and 150'' can also be used to encapsulate the PW for forwarding across the network 300.

Each of the PBT and MPLS networks 302, 304 includes similar network elements to those of the network embodiment described in connection with FIG. 2. More specifically, the PBT network 302 includes a first PE 308-1 that is in communication with a CE 320-1 over an AC 324-1 and with a second PE 328-2 over the PW 306. The MPLS network 304 includes a first PE 310-1 that is in communication with the second PE 308-2 of the PBT network 302 through a network-to-network interface (NNI) 314 and with an egress PE 310-2 over the PW 306. The NNI 314 can be a PW-over-Ethernet link, Ethernet 802.1 Q, Ethernet 802.1ah, etc., although the NNI 364 cannot be an Ethernet 802.1ad link if the PW 306 is not carrying Ethernet service frames. The second PE 310-2 of the MPLS network 304 is in communication with a CE 320-2 over an AC 324-2. The PW 306 spans both PBT and MPLS network domains, from the ingress PE 308-1 to the egress PE 310-2. The PW 306 traverses the PBT network 302 within a PBT trunk 316 and the MPLS network 304 within a MPLS trunk 318.

Also shown are the various formats of packets as the non-Ethernet service frames traverse the communications network 350. Before reaching the PBT network 302, the service frames have the exemplary format 280, including a UNI header 282, an AC header 284, and a PDU 286. Within the PBT network 302, the format of the packets 322 (here, e.g., with the encapsulation format 150''') includes a PBT trunk header 154''', a PW header 158''', and the PW PD'. The PW header 158''' includes a VC label 190.

At the NNI 314 between the PBT and MPLS networks 302, 304, the PBT trunk header 158''' is removed, and the packet receives a NNI header (not shown). The content of the NNI header depends on the type of NNI (e.g., PW over Ethernet link, 802.1ah, etc.). Accordingly, the packet has the PW header 158''', comprised of a VC label 190', an optional control word 192, and the PW PDU 286'. When the service frame enters the MPLS network 304, the NNI header is removed and an MPLS header 324 (i.e., LSP label) added to PW header 158''' and PW PDU 286'. The PW header 158''' includes a VC label 190''. It is to be noted that the various VC labels 190, 190', and 190'' can be the same VC label (i.e., PW label) across the communication network 300 (i.e., the VC label can be negotiated end-to-end—and does not have to change). Alternatively, each VC label 190, 190', and 190'' can be managed locally (and thus be different) within each domain. After the service frames leave the MPLS network 304, their format 280 includes a UNI header 282, AC header 284, and the PDU 286.

Figure 9:
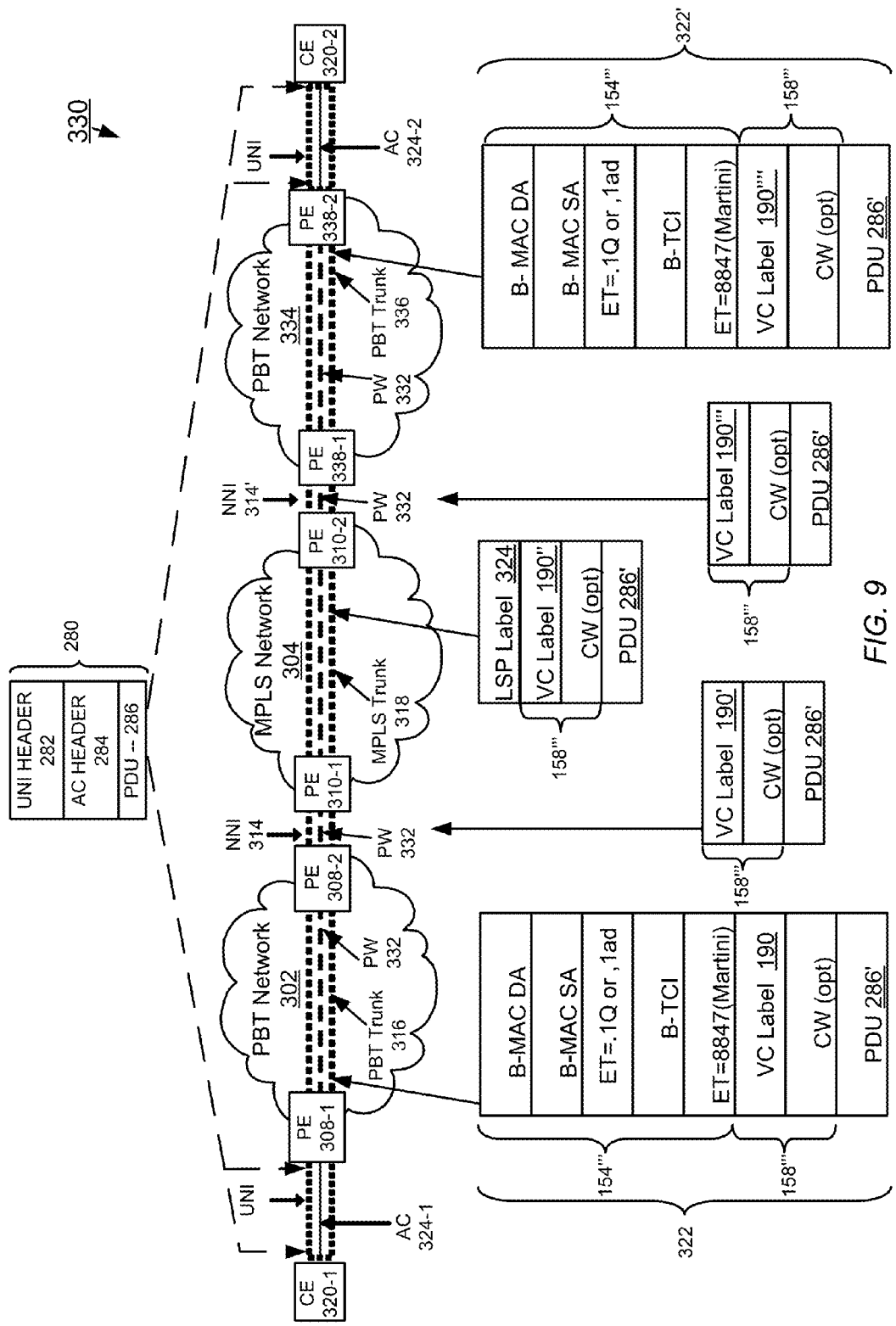
FIG. 9 is a diagram of an embodiment of a PW traversing a first Ethernet network, an MPLS network, and a second Ethernet network in accordance with the invention.

FIG. 9 illustrates another exemplary embodiment of a communications network 330 in which non-Ethernet service frames are forwarded through a multi-segment PW 332. Here, the PW 332 spans a first PBT network 302, an MPLS network 304, and a second PBT network 334. The PW 332 passes through the PBT network 302 within the PBT trunk 316, through the MPLS network 304 within the MPLS trunk 318, and through the second PBT network 334 within a second PBT trunk 336. Within the first and second PBT networks 302, 334, the services frames traversing the PW 332 are encapsulated using the encapsulation format 150'''. Again, any of the other above-described encapsulation formats 150, 150', and 150'' can also be used to encapsulate the service frames for forwarding across the network 330.

The frame formats within and between the first PBT network 302 and the MPLS network 304 are as described in connection with FIG. 8. Between the MPLS network 304 and the second PBT network 334, a NNI 314' removes the MPLS header 324 and applies an NNI header (not shown). The NNI header depends on the type of NNI used (e.g., PW-over-Ethernet link, 802.1ah).

At the second PBT network 334, the ingress PE 336-1 removes the NNI header, leaving the PW header 158''', and prepends a PBT trunk header 154''' thereto. Similar to the network of FIG. 8, the various VC labels 190, 190', 190'', 190''', 190'''' can be the same VC label (i.e., PW label) across the communication network 330 or can be managed locally (and thus be different) within each domain (including the NNIs).

Figure 10:
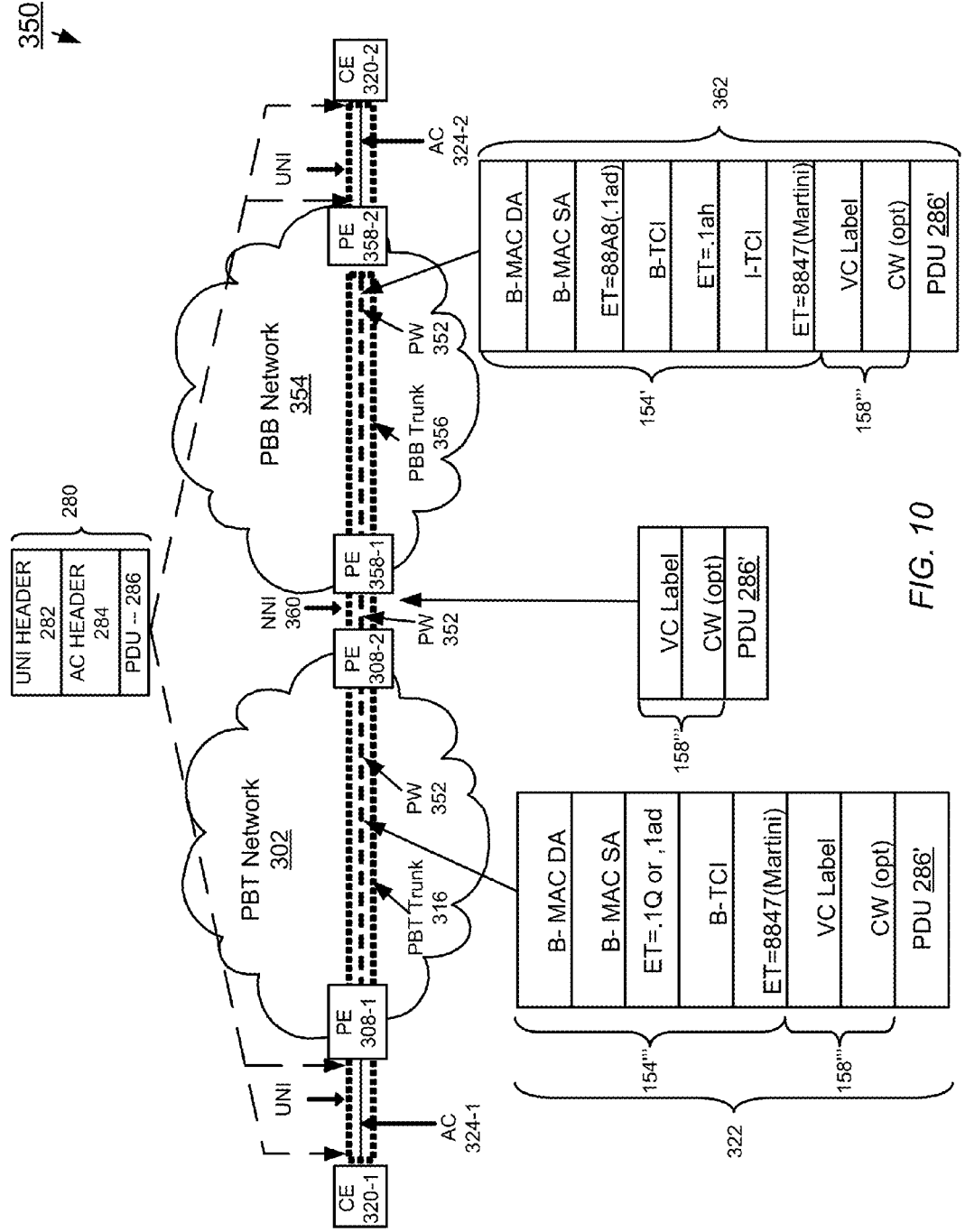
FIG. 10 is a diagram of an embodiment of a PW traversing a first Ethernet network and a second Ethernet network in accordance with the invention.

FIG. 10 illustrates another exemplary embodiment of a communications network 350 in which non-Ethernet service frames are forwarded through a multi-segment PW 352, here, spanning the PBT network 302 (FIG. 8) and a PBB network 354. The PW 352 passes through the PBT network 302 within the PBT trunk 316, and through the PBB network 352 within a PBB trunk 356. Within the PBT network 302, the non-Ethernet service frames are encapsulated using, for example, the encapsulation format is 150'''. The NNI 360 removes the PBT header 154''' and adds an NNI header (not shown) to the PW header 158''' and PW PDU 286'.

Within the PBB network 354, the non-Ethernet service frames are encapsulated using, for example, the encapsulation format 150' (FIG. 4). At the ingress of the PBB network 354, the PE 358-1 removes the NNI header, and adds a PBB header 154' to the PW header 158''' and PW PDU 286'. The packet format 362 is the result. Again, the various VC labels within the PW headers 158''' can be the same VC label across the communication network 330 or can different locally managed VC labels.

The ability to perform end-to-end fault detection and diagnostics of PW services is an important aspect to the deployment of PWs. A tool created for verifying the connectivity of the PW is Virtual Circuit Connection Verification (VCCV). In general, VCCV is a PSN-agnostic control channel associated with a PW that carries encapsulated fault detection and diagnostics messages, e.g., ICMP (Internet Control Message Protocol) ping, BFD (Bidirectional Forwarding Detection), or MPLS ping. Implementation details for VCCV are described in Nadeau, T. et al, "Pseudo Wire Virtual Circuit Connectivity Verification (VCCV)", January 2007, the entirety of which is incorporated by reference herein. The Nadeau document specifies the different types of protocols that can be carried in the VCCV control channel individually or simultaneously.

Until the present invention, as set forth herein, use of the VCCV control channel has been primarily for PWs over MPLS and IP networks. In accordance with the invention, the VCCV channel can carry fault detection and diagnostics messages over Ethernet PSNs, more specifically, Ethernet OAM messages. Ethernet OAM, as defined in 802.1 ag and Y.1731, is a general term for the management capabilities associated with Ethernet technology. It offers a rich set of functionality (tools and utilities) designed for proactive and on-demand OAM. Some of its desirable functionalities, e.g., performance monitoring and remote maintenance, are not achievable with present VCCV messages, namely, MPLS ping and BFD. In addition, Ethernet OAM has certain functionality that satisfies hierarchical OAM requirements identified for multi-segment PWs. Ethernet OAM in VCCV can also be applicable to non-Ethernet PSNs e.g. IP or MPLS, providing an end-to-end PW OAM across different sets of PSNs.

When establishing a PW across the PSN, the PEs can also negotiate to select Ethernet OAM-based VCCV messages. The procedure for negotiating Ethernet OAM is similar to negotiations for other types of OAM-based VCCV messages; instead of LSP Ping, for example, the PEs use a specific-extension associated with selecting Ethernet OAM as an option for an Ethernet PSN. The present invention specifies extensions for supporting Ethernet OAM as an option for VCCV messages.

Figure 11:
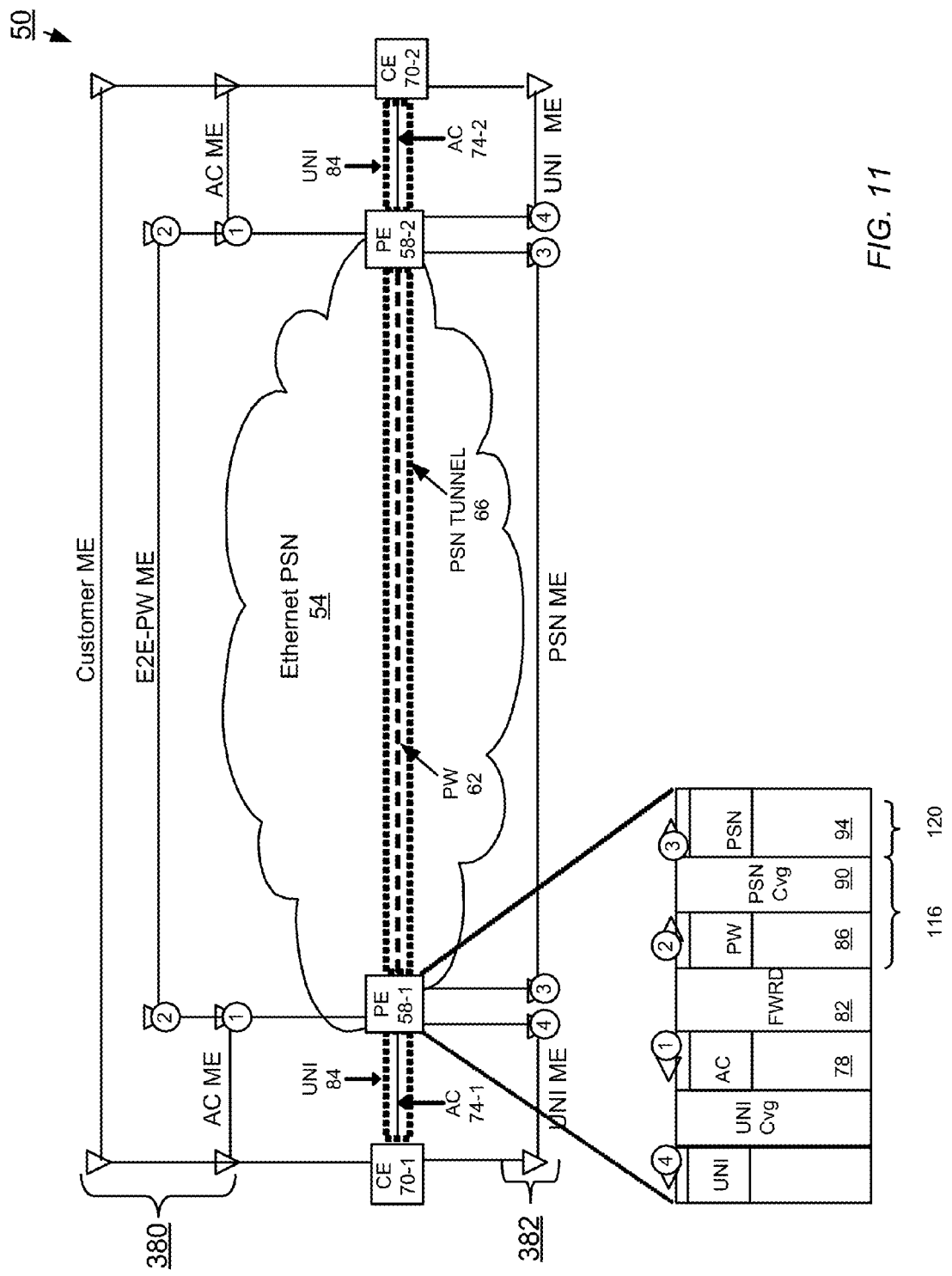
FIG. 11 is of an embodiment of a communications network implementing Ethernet Operations, Administration, Management (OAM) mechanisms for a single-segment PW over an Ethernet PSN.

FIG. 11 shows the communications network 50 of FIG. 2, having a single segment PW 62. Shown in the communications network 50 are various maintenance entities (ME). Each ME corresponds to an OAM span between two monitoring points (in the context of equipment). Some of the MEs are referred to as service MEs 380, others as network MEs 382. Service MEs monitor the connectivity and performance of network services, whereas network MEs monitor the connectivity and performance of the network facilities supporting the services.

The Service MEs 380 include AC MEs, an End-to-End PW (E2E-PW) ME, and a Customer ME. The AC MEs monitor the connectivity and performance of a service across an attachment circuit (e.g., 74-1) between a CE and a PE and are associated with monitoring points labeled "1" on the PE. The E2E-PW ME is associated with monitoring points labeled "2" on the PE and monitors the connectivity and performance of a service across the PW 62. The Customer ME monitors the connectivity and performance of the service from source CE 70-1 to destination CE 70-1.

The Network MEs 382 include UNI MEs and a PSN ME. Each UNI ME monitors the connectivity and performance of the network facilities between a CE and a PE (e.g., 70-1 and 58-1). The PSN ME monitors the connectivity and performance of the network facilities between the PEs 58 over the PSN 54. The PSN ME is associated with monitoring points labeled "3" on the PE, and the UNI MEs are associated with monitoring points labeled "4" on the PE.

Table 1 lists the various OAM mechanisms that each type of ME can use to monitor the connectivity and performance of a service and of the network facility for an Ethernet PSN. In accordance with the principles of the invention, the OAM mechanism used by the E2E-PW ME is the VCCV control channel having an Ethernet OAM payload, as described in more detail below. In addition, because the PSN is an Ethernet PSN, the OAM mechanism for the PSN ME is Ethernet OAM.

TABLE 1

| ME | OAM mechanism | Comment |
| --- | --- | --- |
| E2E-PW | VCCV Channel | Payload is Ethernet OAM |
| PSN | Ethernet OAM | Independent MEG (Maintenance Entity Group) levels |
| UNI, AC, & Customer | Native | Dependent on Technology Used |

Figure 12A:
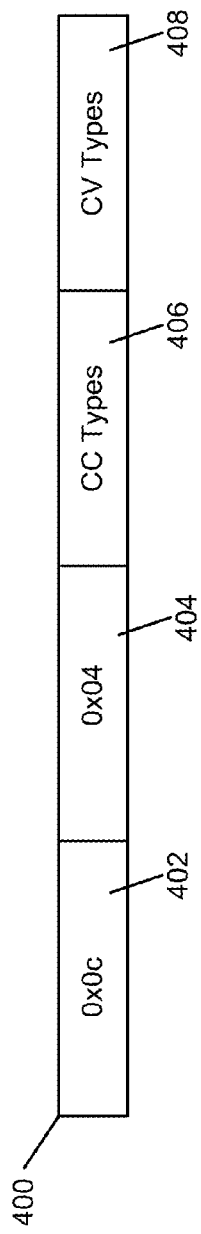
FIG. 12A is a diagram illustrating a Virtual Circuit Connection Verification (VCCV) parameter field used to signal Ethernet OAM capability in accordance with the invention.

Before being able to send Ethernet OAM messages in the VCCV control channel, the PEs 58 at both ends of the PW 62 send signals to each other to indicate the existence of the control channel and their ability to run Ethernet OAM. The use of the VCCV control channel provides the context needed to bind the Ethernet OAM messages to a particular PW. FIG. 12A shows a VCCV parameter field 400 and opcodes that the PEs 58 use for such VCCV capability signaling. The VCCV parameter field 400 can be carried in an interface parameter field (for FEC 128) or in sub-TLV field in the interface parameter field (for FEC 129).

The VCCV parameter field 400 has the following 4-byte format. A first byte 402 includes a parameter identifier (here, equal to 0x0c). The second byte 404 indicates the length (in bytes) of the VCCV parameter field (here, 4 bytes). A third byte 406 signifies the CC (control channel) type. Through use of the third byte 406, the PEs 58 select one of the currently defined options (shown in FIG. 12B) for conveying the VCCV control channel. Table 2 shows the associations between certain specified values and the CC types.

TABLE 2

| Value | CC Type |
| --- | --- |
| 0x01 | PWE3 control word with 1st nibble as 0x0001 |
| 0x02 | MPLS Router Alert Label |
| 0x04 | MPLS PW Demultiplexer Label TTL = 1 |

Figure 12B:
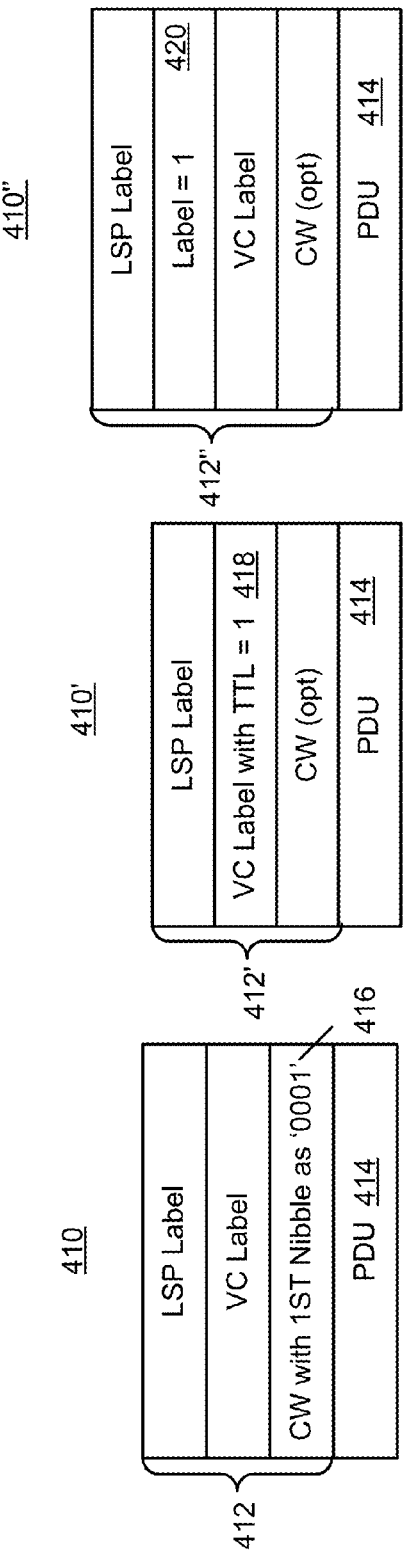
FIG. 12B are diagrams illustrating various options for identifying a packet that is carrying an Ethernet OAM packet data unit (PDU) in accordance with the invention.

Referring to FIG. 12B, the options include a Control Word (CW) option 410, a Time-To-Live (TTL) option 410', and a Router Alert option 410". Each option uses a different field of a respective header 412, 412', and 412" (generally, 412) to indicate that the encapsulated PDU 414 corresponds to a VCCV PDU. Each header 412 includes an MPLS header (LSP label) and a PW header. When using the CW option 410, the PEs 58 place a value equal to 0001b in the first nibble of the CW field 416. For the TTL option 410', the PEs place a time-to-live value equal to 1 in a VC label field 418. The Router Alert option 410" includes an additional label 420, between the LSP label and VC label, set equal to 1. Whichever option is used, the LSP label is stripped before the PW contents, including the associated VCCV PDU 414, can be processed.

Returning to FIG. 12A, a fourth byte 408 is a CV (Control Value)) Type Indicators field, which is a bit mask used to indicate the specific type(s), i.e., none, one, or more, of the control channel packets that may be sent on the specified control value. Table 3 shows the various specifiable control values and their associated types.

TABLE 3

| Value | Type |
| --- | --- |
| 0x01 | ICMP Ping |
| 0x02 | LSP Ping |
| 0x04 | BFD for PW Fault Detection only |
| 0x08 | BFD for PW Fault Detection and AC/PW Fault Status Signaling |
| 0x10 | Proposed value for Ethernet OAM as defined in [Y1731] and [802.1ag] |

The particular CV type value (here, 0x10) associated with Ethernet OAM is exemplary, and selected to be backwards compatible with existing VCCV fault detection and diagnostics mechanisms. Setting the CV indicators field 408 equal to 0x10 signifies that the VCCV control channel is to be carrying Ethernet OAM in the PDU 414 (FIG. 12B).

Figure 12C:
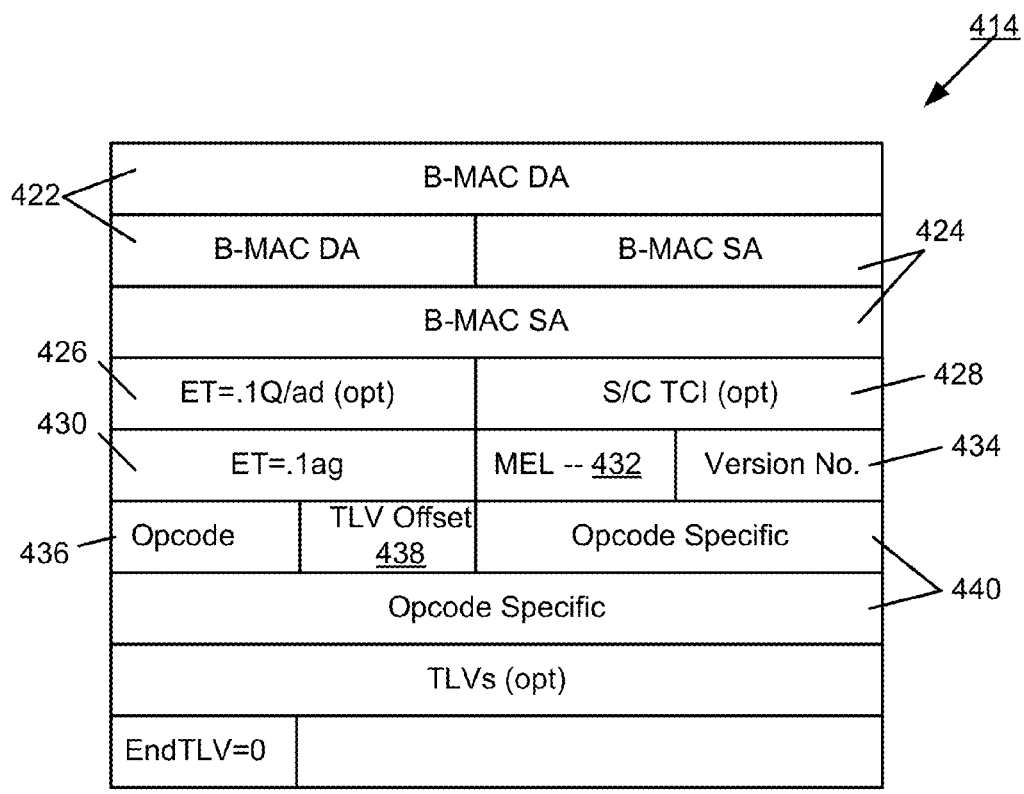
FIG. 12C is a diagram illustrating an embodiment of an Ethernet OAM PDU.

FIG. 12C shows an embodiment of a byte-format for an Ethernet OAM PDU 414 to be carried by the VCCV control channel. The Ethernet OAM PDU 414 includes a B-MAC DA field 422, a B-MAC SA field 424, an optional Ethertype field 426, an optional S/C-Tag 428, an Ethertype field 430, a Maintenance Entity Level (MEL) field 432, a Version field 434, an opcode field 436, a Time-to-Live (TLV) offset field 438, and an opcodes-specific field 440.

The B-MAC DA field 422 can hold a dummy value (e.g., 6 bytes) or carry an OAM-specific multicast/Unicast address. The B-MAC SA field 424 can hold a dummy value (e.g., 6 bytes) or carry a Tx MEP's (Maintenance Entity Group End Point) Unicast address. The optional Ethertype field 426, when present, indicates the type in the following field (S/C tag 428), i.e. whether it is a C-TAG when ET=0x8100 or S-TAG when ET=0x88a8). The optional S/C-Tag 428 can hold an optional two-byte forwarding tag associated with a service instance. The Ethertype field 430 is set equal to the code associated with 802.1ag, to indicate, when present, that subsequent sets of fields are OAM related fields. The MEL field 432 holds a one-byte value of a MEG Level (0-7) to identify a hierarchical domain. The one-byte Version field 434 holds the protocol version. The opcodes field 436 holds a one-byte value that indicates the type of Ethernet OAM message being carried by the VCCV control channel. The TLV field 438 holds a one-byte value indicating time to live for the Ethernet OAM PDU 414. The opcodes-specific field 440 holds opcode-specific values that are needed to achieve the OAM function indicated by opcode in opcode field 436. The byte sizes of each field are exemplary; such fields can be smaller or larger in size without departing from the principles of the invention.

Table 4 shows exemplary opcodes for Ethernet OAM messages that can be carried in the VCCV control channel

TABLE 4

| Opcode Value | Ethernet OAM Message Type |
|---|---|
| 01 | CCM - Continuity check messages |
| 02 | LBR - Loopback reply message |
| 03 | LBM - Loopback request message |
| 04 | LTR - Linktrace reply message |
| 05 | LTM - Linktrace request message |
| 33 | AIS - Alarm indication signal message |
| 41 | MCC - Maintenance communication channel message |
| 42 | LMR - Single-ended oss measurement reply message |
| 43 | LMM - Single-ended loss measurement request message |
| 45 | LDM - Dual-ended delay measurement message |
| 46 | DMR - Two-way delay measurement reply message |
| 47 | DMM - Two-way delay measurement request message |
| XX | Available for other message types. |

Figure 12D:
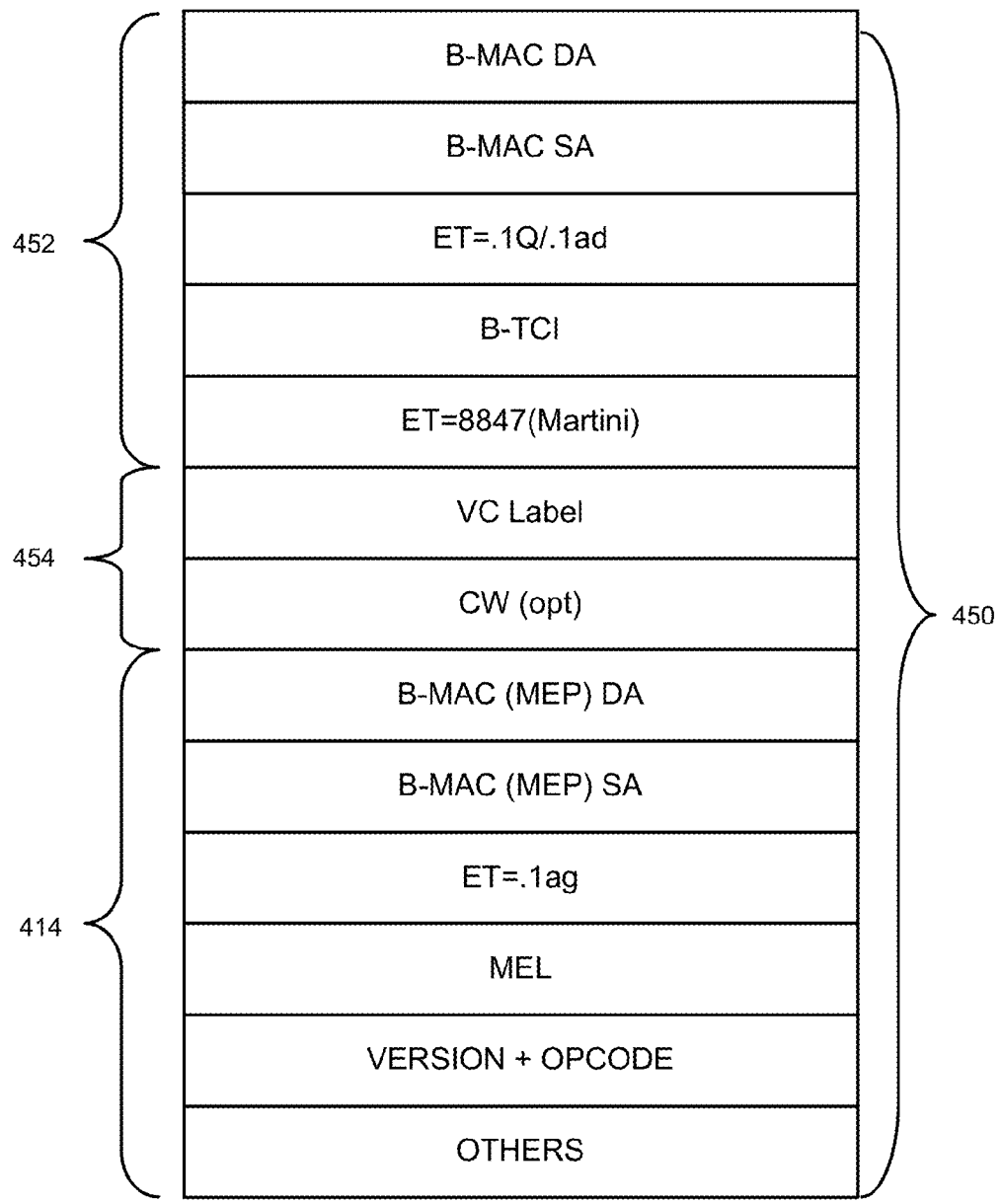
FIG. 12D is a diagram illustrating an embodiment of a packet having an Ethernet OAM PDU encapsulated in accordance with the data-plane encapsulation format of FIG. 6.

To transmit Ethernet OAM messages in the VCCV control channel of the PW, any of the encapsulation mechanisms described above in connection with FIGS. 2 through 10 can be used to carry the VCCV payload 414. FIG. 12D shows an exemplary embodiment of a frame format 450 for a packet sent over the PW 62 for an E2E PW ME. In this embodiment, the data plane encapsulation format is that embodiment 150''' shown and described in connection with FIG. 6. The frame format 450 includes a PSN tunnel header 452, a PW header 454, and the Ethernet OAM PDU 414.

Figure 13:
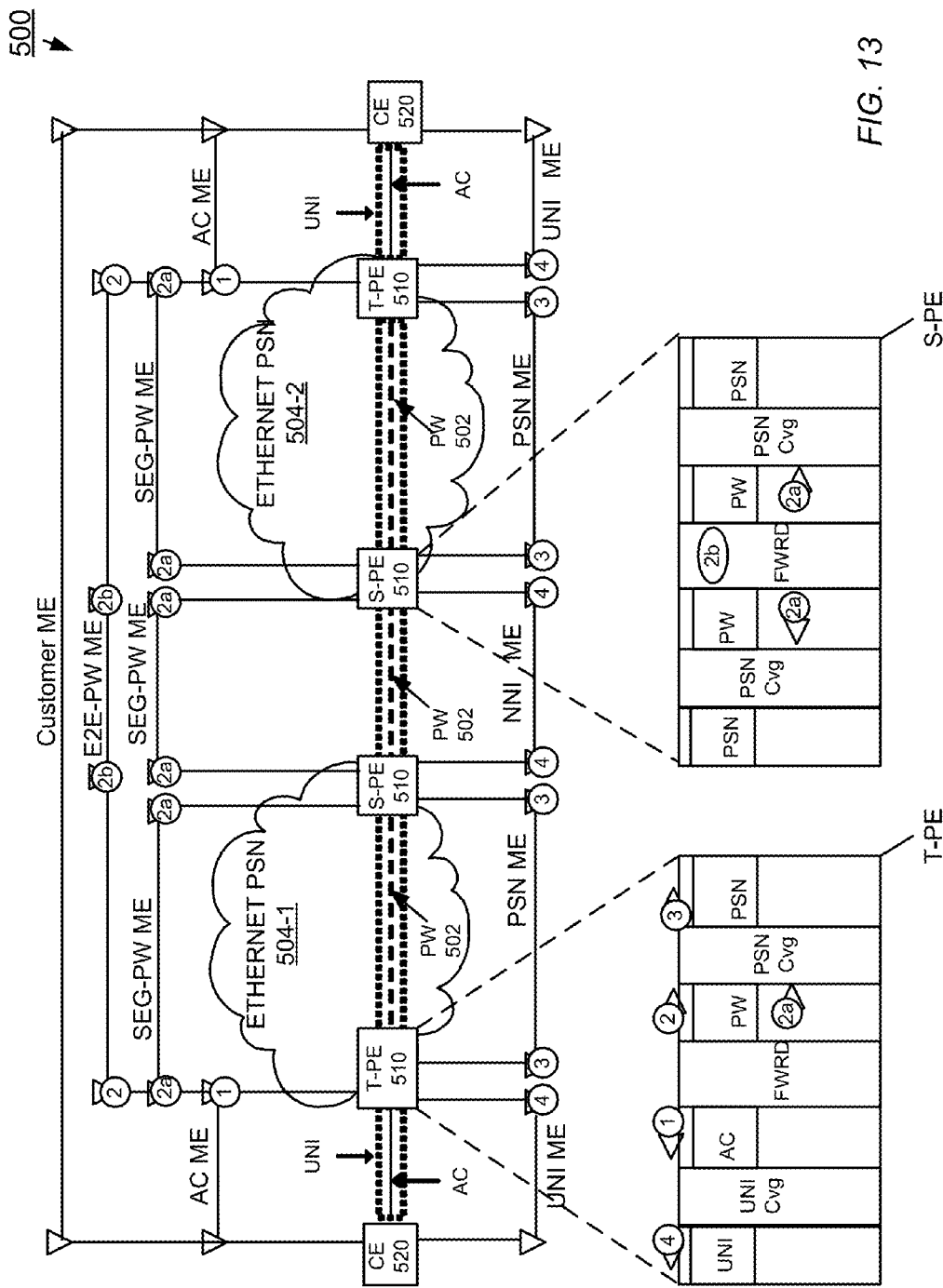
FIG. 13 is a diagram illustrating the forwarding of Ethernet OAM PDUs over a multi-segment PW that traverses a first Ethernet network and a second Ethernet network in accordance with the invention.

FIG. 13 shows an embodiment of a communications network 500, with a multi-segment PW 502 spanning first and second Ethernet PSNs, 504-1, 504-2 (generally, 504). The PEs 510 in the communications network 500 are distinguished by whether they communicate with a CE device 520, these being labeled T-PE, or with a PE 510 in the other PSN, these being labeled S-PE.

In addition to the various MEs shown and described in connection with FIG. 11, the multi-segment PW 502 has other service MEs associated with the various PW segments, labeled SEG-PW ME, and another network ME associated with a network-to-network interface between the Ethernet PSNs 504, labeled NNI ME. In addition, each PSN 504-1, 504-2 has a PSN ME. The SEG-PW MEs are associated with monitoring points labeled "2a" at the T-PE and S-PE; the NNI ME is associated with monitoring points labeled "4" at the S-PEs. The UNI MEs are associated with monitoring points labeled "4" at the T-PEs.

Table 5 lists the various OAM mechanisms for each type of ME in the communications network 500 that can be used to monitor the connectivity and performance of PW services (Ethernet and non-Ethernet) and the network facility across a multi-segment PW that traverses multiple Ethernet PSNs.

TABLE 5

| ME | OAM mechanism | Comment |
|---|---|---|
| At a T-PE | | |
| E2E-PW | VCCV Channel | Payload is Ethernet OAM; shared MELs |
| SEG-PW | VCCV Channel | Payload is Ethernet OAM; shared MELs |
| PSN | Ethernet OAM | Independent MEG levels |
| UNI & AC | Native | Dependent on Technology Used |
| At an S-PE | | |
| SEG-PW | VCCV Channel | Payload is Ethernet OAM; shared MELs |
| Intermediate point for E2E-PW | VCCV channel | Payload is Ethernet OAM; shared MELs |
| NNI | Native | Dependent on technology used |
| At Customer CE | | |
| Customer ME, AC, UNI | Native | Dependent on technology used |

Figure 14:
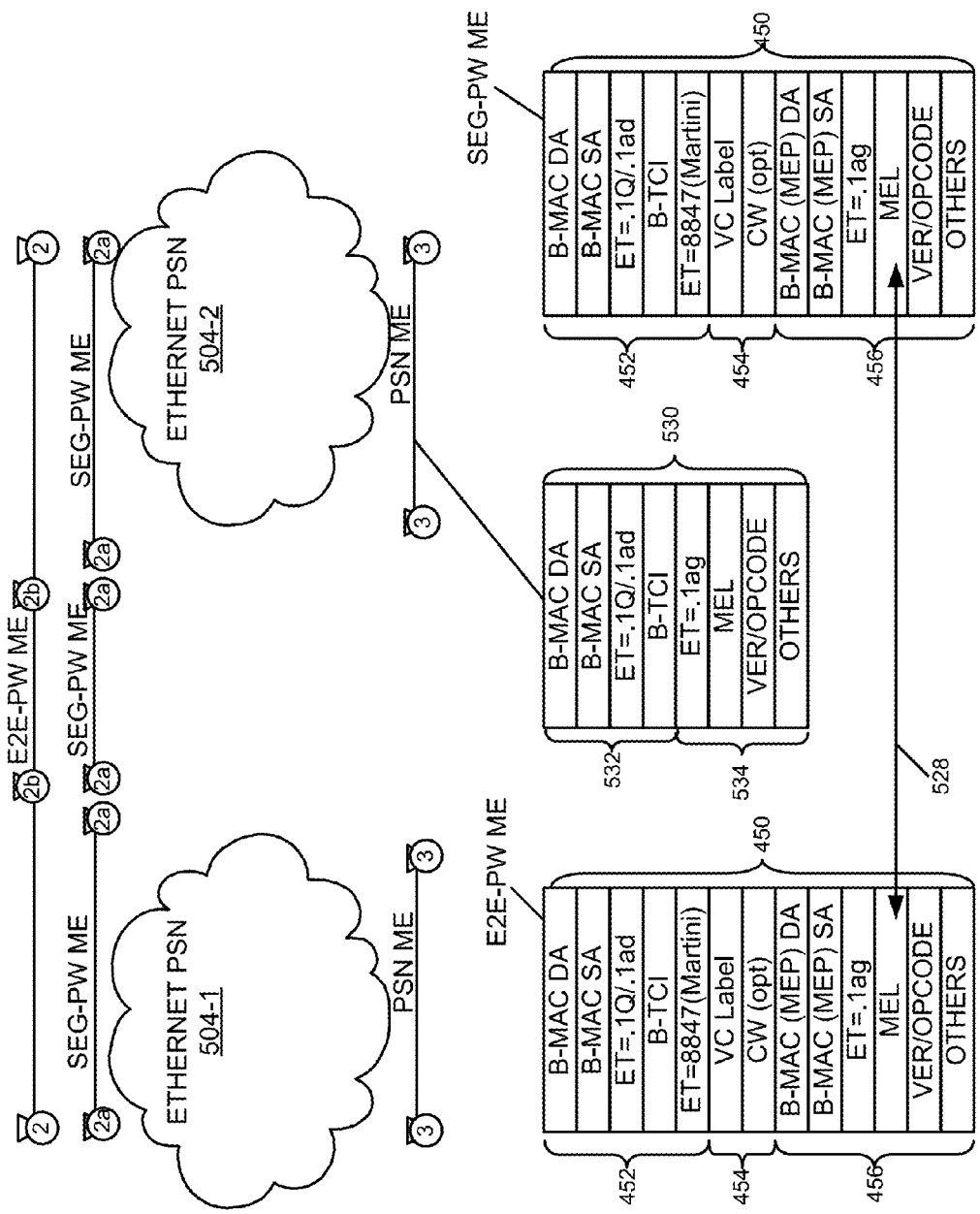
FIG. 14 is a diagram illustrating exemplary encapsulation formats used for the Ethernet OAM PDUs in the multi-segment PW of FIG. 13.

FIG. 14 shows examples of frames formats on the PW 502 (FIG. 13) for the E2E-PW ME, each SEG-PW ME, and each PSN ME. As shown, the E2E-PW ME and SEG-PW MEs employ, as an example, the frame format 450 of FIG. 12D. The E2E-PW ME and SEG-PW ME share MELs (denoted by double-ended arrow 528). The PSN ME uses an Ethernet OAM PDU 530 having an Ethernet header 532 and Ethernet OAM information 534. Each PSN ME uses independent MEL values.

Figure 15:
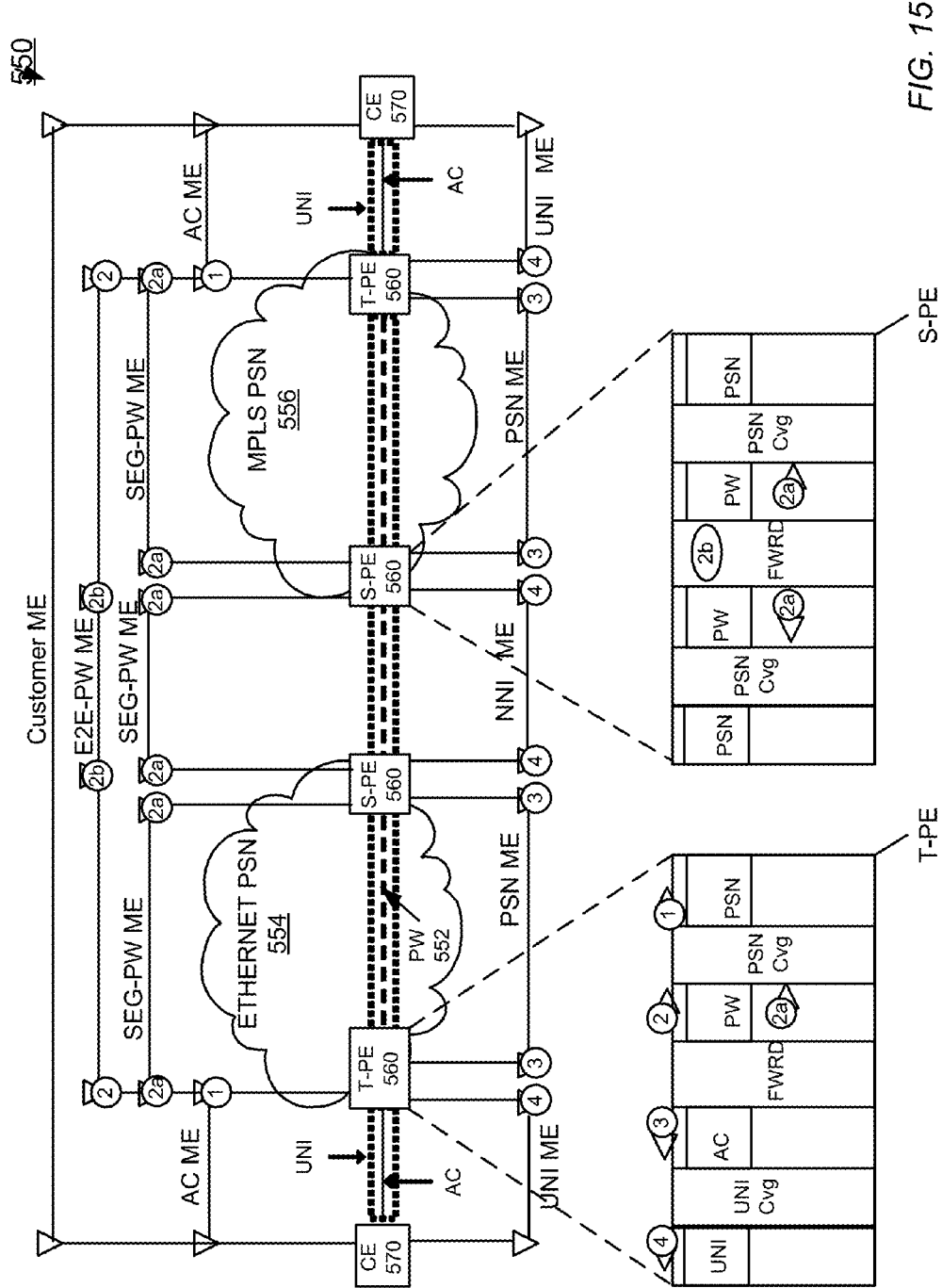
FIG. 15 is a diagram illustrating the forwarding of Ethernet OAM PDUS over a multi-segment PW that traverses an Ethernet network and an MPLS network in accordance with the invention.

FIG. 15 shows an embodiment of a communications network of FIG. 550 with a multi-segment PW 552 spanning a PBT network 554 and an MPLS network 556. As in FIG. 13, the PEs 560 in the communications network 550 are distinguished by whether they communicate with a CE device 570, these being labeled T-PE, or with a PE 560 in the other PSN, these being labeled S-PE. The various MEs and monitoring points are similar to those described in connection with FIG. 13.

Table 6 lists the various OAM mechanisms for each type of ME in the communications network 550 that can be used to monitor the connectivity and performance of PW services (Ethernet and non-Ethernet) and the network facility across the multi-segment PW 552. The OAM mechanisms listed in Table 6 presumes the PBT equipment and the MPLS equipment have common PW functionality.

TABLE 6

| ME | OAM Mechanism | Comment |
|---|---|---|
| AT A T-PE | | |
| E2E-PW (PBT & MPLS) | VCCV channel | Payload is Eth OAM; shared MELs |
| Seg-PW (PBT & MPLS) | VCCV channel | Payload is Eth OAM; shared MELs |
| Intermediate point for E2E-PW | VCCV channel | Payload is Eth OAM; shared MELs |

TABLE 6-continued

| ME | OAM Mechanism | Comment |
|---|---|---|
| PBT PSN | Ethernet OAM | Independent MEG Levels |
| MPLS PSN | LSP Ping, BFD | For MPLS |

If the PBT equipment does not support BFD/LSP Ping and the MPLS equipment does not support Ethernet OAM, Table 7 illustrates the OAM mechanisms that are then available for use by the various MEs across the communications network 550.

TABLE 7

| ME | OAM Mechanism | Comment |
|---|---|---|
| *At the PBT T-PE* | | |
| E2E-PW | Undetermined | |
| Seg-PW | VCCV channel | Payload is Eth OAM; shared MELs |
| PSN | Ethernet OAM | Independent MEG Levels |
| *At the PBT S-PE* | | |
| Seg-PW | VCCV channel | Payload is Eth OAM; shared MELs |
| Intermediate point for E2E-PW | Undetermined | |
| *At the MPLS T-PE* | | |
| E2E-PW | Undetermined | |
| Seg-PW | VCCV channel | Payload is BFD/LSP Ping |
| PSN | LSP Ping, BFD | For MPLS PSN |
| *At the MPLS S-PE* | | |
| Seg-PW | VCCV channel | Payload is BFD/LSP Ping |
| Intermediate point for E2E-PW | Undetermined | |

Figure 16:
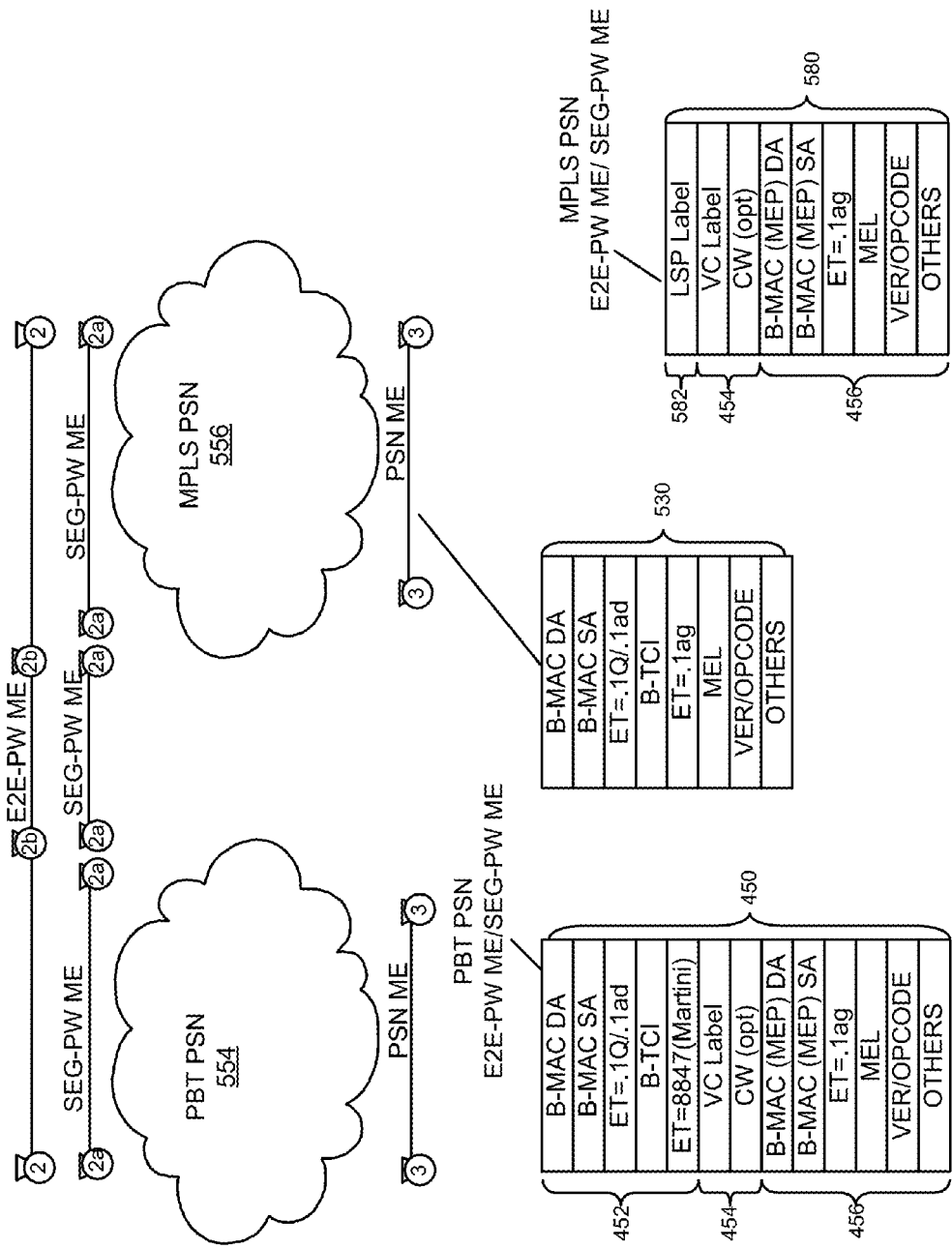
FIG. 16 is a diagram illustrating encapsulation formats used for forwarding Ethernet OAM PDUs over the multi-segment PW of FIG. 15.

FIG. 16 shows examples of frames formats on the PW 552 (FIG. 15) for the E2E-PW ME, each SEG-PW ME, and each PSN ME in the PBT PSN 554 and in the MPLS PSN 556. For the PBT PSN 554, the frame formats for E2E-PW ME, the SEG-PW ME, and the PSN ME are similar to those described for the PBT PSN 502 of FIG. 13. With respect to the MPLS PSN 556, the frame format 580 used by the E2E-PW ME and SEG-PW ME has an MPLS header 582 that encapsulates the PW header 454 and Ethernet OAM PDU 456 passed to the MPLS PSN 556 from the PBT PSN 554.

Aspects of the present invention may be embodied in hardware or software (i.e., program code). Program code may be embodied as computer-executable instructions on or in one or more articles of manufacture, or in or on computer-readable medium. A computer, computing system, or computer system, as used herein, is any programmable machine or device that inputs, processes, and outputs instructions, commands, or data. In general, any standard or proprietary, programming or interpretive language can be used to produce the computer-executable instructions. Examples of such languages include C, C++, Pascal, JAVA, BASIC, Visual Basic, and Visual C++.

Examples of articles of manufacture and computer-readable medium in which the computer-executable instructions may be embodied include, but are not limited to, a floppy disk, a hard-disk drive, a CD-ROM, a DVD-ROM, a flash memory card, a USB flash drive, an non-volatile RAM (NVRAM or NOVRAM), a FLASH PROM, an EEPROM, an EPROM, a PROM, a RAM, a ROM, a magnetic tape, or any combination thereof. The computer-executable instructions may be stored as, e.g., source code, object code, interpretive code, executable code, or combinations thereof. Further, although described predominantly as software, embodiments of the described invention may be implemented in hardware (digital or analog), software, or a combination thereof.

While the invention has been shown and described with reference to specific preferred embodiments, it should be understood by those skilled in the art that various changes in form and detail may be made therein without departing from the spirit and scope of the invention as defined by the following claims.

What is claimed is:

1. A communications network comprising:
   an Ethernet packet-switched network (PSN);
   a first provider edge (PE) device in communication with a second PE device through the Ethernet PSN;
   a pseudowire (PW) established between the PE devices for emulating a service across the Ethernet PSN, each packet of the service having a frame format with an Ethernet tunnel header and a PW header that encapsulates a payload; and
   a Multi-Protocol Label Switching (MPLS) network in communication with the Ethernet PSN, wherein the PW extends through the MPLS network and the Ethernet PSN, and wherein each packet is forwarded through the MPLS network after removing the Ethernet tunnel header from the packet and adding a Multi-Protocol Label Switching (MPLS) tunnel header to the packet.

2. The communications network of claim 1, wherein the service is a non-Ethernet service and the payload is a non-Ethernet payload.

3. The communications network of claim 1, wherein the service is an Ethernet service and the payload is an Ethernet payload.

4. The communications network of claim 1, wherein the payload is normalized by Martini encapsulation.

5. The communications network of claim 1, wherein the PW header of the frame format includes an Ethertype field used to signify a type of service of the non-Ethernet payload.

6. The communications network of claim 1, wherein the PW header includes a service identifier (I-SID) for identifying a particular flow of the non-Ethernet service.

7. The communications network of claim 1, wherein the Ethernet tunnel header of the frame format includes an Ethertype signifying Martini encapsulation of the PW.

8. The communications network of claim 1, wherein the PW header of the frame format includes a VC (Virtual Circuit) label used to identify a particular flow of the service.

9. The communications network of claim 1, wherein the Ethernet PSN is configured to provide Provider Backbone Transport (PBT).

10. The communications network of claim 1, wherein the Ethernet PSN is configured to provide Provider Backbone Bridging (PBB).

11. The communications network of claim 1, wherein the Ethernet PSN adds an Ethernet 802.1ah tag to each packet of the service to forward the packet to the MPLS network.

12. A method of emulating a service across an Ethernet packet-switched network (PSN), the method comprising:
   configuring the Ethernet PSN to provide Provider Backbone Bridging (PBB);
   establishing a pseudowire (PW) between a first provider edge (PE) device and a second PE device on the Ethernet PSN;
   encapsulating a payload of packets of the service in a PW header and in an Ethernet tunnel header; and
   receiving a packet of the service at the first PE device for forwarding to the second PE device through the Ethernet PSN over the PW; and forwarding the packet through a Multi-Protocol Label Switching (MPLS) network after removing the Ethernet tunnel header from the packet and adding a MPLS tunnel header to the packet.

13. The method of claim 12, wherein the service is a non-Ethernet service and the payload is non-Ethernet payload.

14. The method of claim 12, wherein the service is an Ethernet service and the payload is Ethernet payload.

15. The method of claim 12, further comprising the step of normalizing the payload by Martini encapsulation.

16. The method of claim 12, further comprising the step of signifying a type of service of the payload in an Ethertype field in the PW header.

17. The method of claim 12, further comprising the step of identifying a particular flow of the service with a service identifier (I-SID) in the PW header.

18. The method of claim 12, further comprising the step of signifying, in the Ethernet tunnel header, Martini encapsulation of the PW.

19. The method of claim 12, further comprising the step of identifying a particular flow of the service with a VC (Virtual Circuit) label in the PW header.

20. The method of claim 12, further comprising the step of configuring the Ethernet PSN to provide Provider Backbone Transport (PBT).

21. The method of claim 12, comprising adding an Ethernet 802.1ah tag to each packet of the service for forwarding the packet to the MPLS network.

22. The method of claim 12, further comprising the steps of removing the MPLS tunnel header from the packet, and adding the Ethernet tunnel header to the packet for forwarding through the Ethernet PSN.

* * * * *

UNITED STATES PATENT AND TRADEMARK OFFICE
CERTIFICATE OF CORRECTION

PATENT NO. : 8,917,731 B2  
APPLICATION NO. : 13/933330  
DATED : December 23, 2014  
INVENTOR(S) : Dinesh Mohan and Florin Balus Page 1 of 1

It is certified that error appears in the above-identified patent and that said Letters Patent is hereby corrected as shown below:

In The Specification

Column 9, Line 42:
"PW PD" should read "PW PDU 286'". The phrase should read "...includes a PBT trunk header 154''', a PW header 158''' and the PW PDU 286'.".

Signed and Sealed this
Twelfth Day of May, 2015

Michelle K. Lee
*Director of the United States Patent and Trademark Office*